US012781433B2

(12) United States Patent
Tamura

(10) Patent No.: US 12,781,433 B2
(45) Date of Patent: Nov. 3, 2026

(54) SHEET MANUFACTURING APPARATUS AND POWER SWITCHING DEVICE

(71) Applicant: SEIKO EPSON CORPORATION, Tokyo (JP)

(72) Inventor: Tetsuya Tamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 18/748,164

(22) Filed: Jun. 20, 2024

(65) Prior Publication Data

US 2024/0426055 A1 Dec. 26, 2024

(30) Foreign Application Priority Data

Jun. 22, 2023 (JP) ................................ 2023-102307

(51) Int. Cl.
*D21F 1/32* (2006.01)
*F16H 3/44* (2006.01)

(52) U.S. Cl.
CPC ............... *D21F 1/325* (2013.01); *F16H 3/44* (2013.01)

(58) Field of Classification Search
CPC .......... D21F 1/325; D21F 1/0027; D21F 1/32; D21F 7/00; F16H 3/44; F16H 3/003; B29C 43/24; B29C 43/04; B08B 1/20; B08B 1/34; B08B 1/165; B08B 1/54; B08B 1/14; B08B 1/12; D21G 9/00; D21G 9/0009
See application file for complete search history.

(56) References Cited

U.S. PATENT DOCUMENTS

| | | | | |
|---|---|---|---|---|
| 5,882,127 | A | 3/1999 | Amano | |
| 11,725,343 | B2 * | 8/2023 | Yanagawa | D21F 3/02 162/274 |
| 2005/0029391 | A1 | 2/2005 | Cocciadiferro et al. | |
| 2014/0290886 | A1 | 10/2014 | Nagai et al. | |
| 2019/0270220 | A1 | 9/2019 | Oguchi et al. | |
| 2022/0316136 | A1 * | 10/2022 | Yanagawa | D21F 3/02 |
| 2024/0426055 | A1 * | 12/2024 | Tamura | F16H 3/44 |
| 2026/0071383 | A1 * | 3/2026 | Tamura | D21G 1/0073 |

FOREIGN PATENT DOCUMENTS

| | | | | | |
|---|---|---|---|---|---|
| CN | 119061718 | A | * 12/2024 | | D21H 11/14 |
| CN | 119114489 | A | * 12/2024 | | D21G 9/0009 |
| CN | 119175829 | A | * 12/2024 | | F16H 3/003 |
| JP | 7631992 | B2 | * 2/2005 | | D21F 3/02 |

(Continued)

*Primary Examiner* — Jose A Fortuna
(74) *Attorney, Agent, or Firm* — Spencer Fane LLP

(57) ABSTRACT

A sheet manufacturing apparatus includes a processing roller, a first processing unit configured to clean the processing roller, a second processing unit configured to separate the first processing unit from the processing roller, a driving unit configured to drive the first processing unit and the second processing unit, and a gear interposed between the driving unit and the first processing unit and the second processing unit. The gear includes an input gear configured to receive driving force from the driving unit, an input shaft configured to rotate in conjunction with the input gear, and a first gear and a second gear whose rotation shaft is the input shaft. Driving force in a first rotation direction is output from the input shaft to the first processing unit via the first gear, and driving force in a second rotation direction is output from the input shaft to the second processing unit via the second gear.

6 Claims, 16 Drawing Sheets

(56) References Cited

FOREIGN PATENT DOCUMENTS

| | | | | | |
|---|---|---|---|---|---|
| JP | 2014-208923 | A | | 11/2014 | |
| JP | 2022-156155 | A | | 10/2022 | |
| JP | 2024172106 | A | * | 12/2024 | ............. D21H 11/14 |
| JP | 2024177757 | A | * | 12/2024 | ........... D21G 9/0009 |
| JP | 2025002257 | A | * | 1/2025 | ............. F16H 3/003 |

* cited by examiner

SHEET MANUFACTURING APPARATUS AND POWER SWITCHING DEVICE

The present application is based on, and claims priority from JP Application Serial Number 2023-102307, filed Jun. 22, 2023, the disclosure of which is hereby incorporated by reference herein in its entirety.

BACKGROUND

1. Technical Field

The present disclosure relates to a sheet manufacturing apparatus and a power switching device.

2. Related Art

An apparatus for manufacturing a sheet or the like by compression-forming a web containing fibers derived from paper has been known. For example, JP-A-2022-156155 discloses a cleaning mechanism for removing paper dust adhering to a calender roller for forming. The above-described mechanism in a fiber structure manufacturing apparatus performs cleaning of the calender roller with a felt roller for cleaning being rotated and in contact with the calender roller.

However, in the apparatus described in JP-A-2022-156155, there is a problem in that, when a mechanism for separating the felt roller from the calender roller is provided, suppressing an increase in cost is difficult due to an addition of a motor and the like for driving the mechanism. In addition, there is a problem in that the addition of the motor is likely to hinder reducing the size of the apparatus.

Specifically, when the felt roller is always in contact with the calender roller, the surface of the felt roller is likely to be worn or deformed. Therefore, a mechanism may be provided for separating the felt roller from the calender roller. However, when the above-described mechanism is provided, in addition to a drive motor for rotationally driving the felt roller, a motor for driving the above-described mechanism is required. This may lead to an increase in cost and size of the apparatus. That is, there has been a demand for a sheet manufacturing apparatus that includes a mechanism for separating a roller for cleaning and that suppresses an increase in cost and facilitates a reduction in size.

SUMMARY

A sheet manufacturing apparatus includes a processing roller configured to process a web containing fibers, a first processing unit configured to come into contact with and clean the processing roller, a second processing unit configured to separate the first processing unit from the processing roller, a driving unit configured to drive the first processing unit and the second processing unit, and a power switching unit interposed between the driving unit and the first processing unit and the second processing unit. The power switching unit includes an input gear configured to receive, from the driving unit, driving force in a first rotation direction and driving force in a second rotation direction, an input shaft configured to rotate in the first rotation direction and in the second rotation direction in conjunction with the input gear, and a first gear and a second gear whose rotation shaft is the input shaft. The driving force in the first rotation direction is output from the input shaft to the first processing unit via the first gear, and the driving force in the second rotation direction is output from the input shaft to the second processing unit via the second gear.

A power switching device includes an input gear configured to receive driving force in a first rotation direction and driving force in a second rotation direction, an input shaft configured to rotate in the first rotation direction and in the second rotation direction in conjunction with the input gear, and a first gear and a second gear whose rotation shaft is the input shaft. The first gear and the second gear each include a one-way clutch, the one-way clutch of the first gear transmits only the driving force in the first rotation direction from the input shaft, and the one-way clutch of the second gear transmits only the driving force in the second rotation direction from the input shaft.

BRIEF DESCRIPTION OF THE DRAWINGS

FIG. 7 is an enlarged side view illustrating a configuration and arrangement of a fourth processing unit and the like.

FIG. 10 is a schematic side view illustrating a transmission path of driving force to a first processing unit and the like.

FIG. 11 is a schematic side view illustrating a transmission path of driving force to a second processing unit and the like.

DESCRIPTION OF EMBODIMENTS

In the following embodiment, a sheet manufacturing apparatus 1 that recycles paper pieces such as used paper in a dry process will be exemplified and described with reference to the accompanying drawings. The sheet manufacturing apparatus of the present disclosure is not limited to a dry type, and may be a wet type. Note that, in the present specification, the term "dry" means not to be performed in a liquid but to be performed in air, such as in the atmosphere.

In each of the following drawings, XYZ-axes are given as coordinate axes orthogonal to each other, a direction indicated by each arrow is set as a +direction, and a direction opposite to the +direction is set as a −direction. A Z-axis is a virtual axis along the vertical direction, and a +Z direction is an upward direction and a −Z direction is a downward direction. The −Z direction is a direction in which gravity acts. In addition, in the sheet manufacturing apparatus 1, a leading side in a transport direction of a raw material, a web, a sheet, and the like may be referred to as downstream, and a trailing side in the transport direction may be referred to as upstream. For convenience of illustration, the size of each member is different from the actual size.

Figure 1:
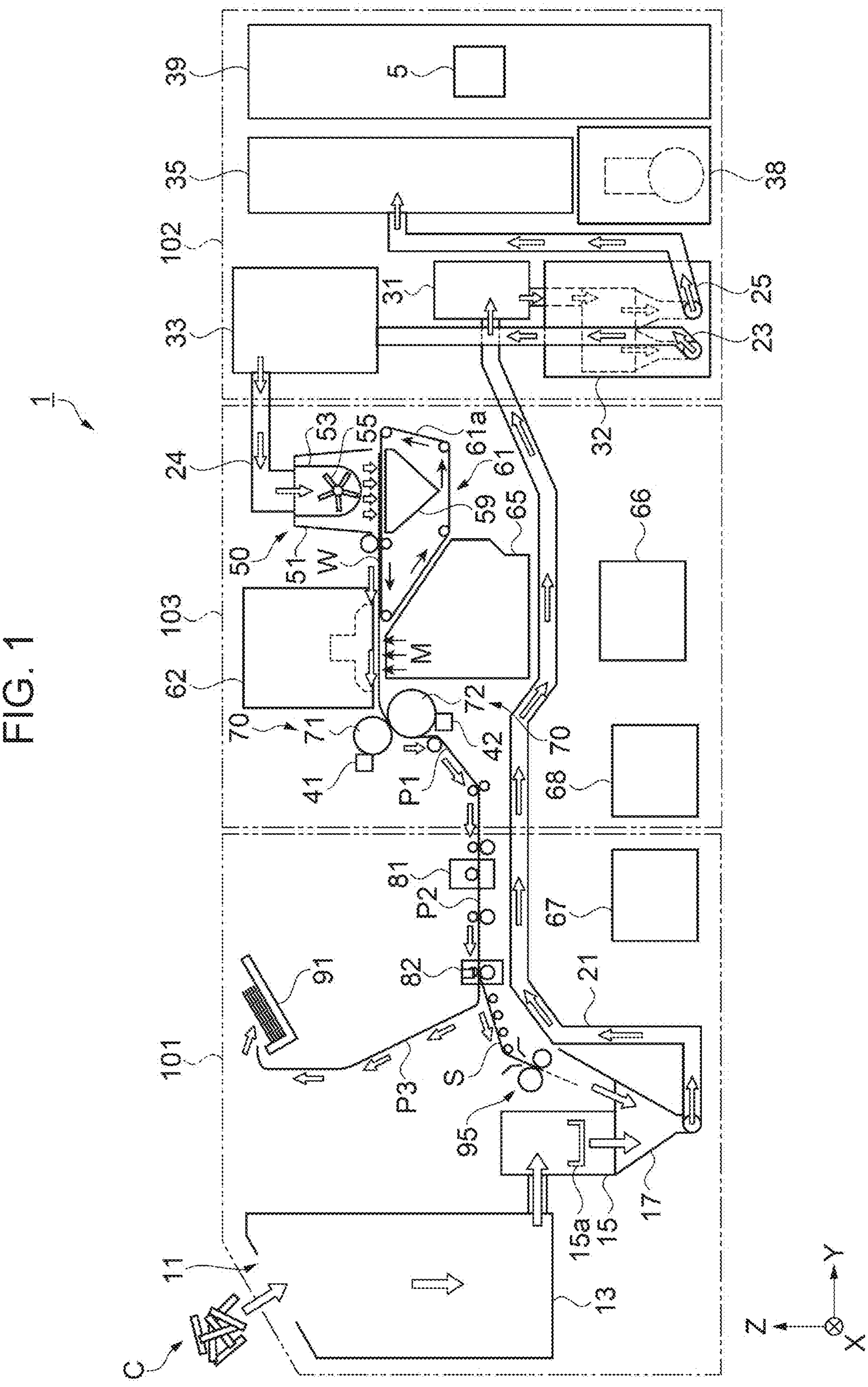
FIG. 1 is a schematic diagram illustrating a configuration of a sheet manufacturing apparatus according to an embodiment.

As illustrated in FIG. 1, the sheet manufacturing apparatus 1 according to the present embodiment includes a first unit group 101, a second unit group 102, and a third unit group 103. The first unit group 101, the second unit group 102, and the third unit group 103 are supported by a frame (not illustrated). Note that, in FIG. 1, directions in which used paper C, a sheet P3, a slit piece S, an unnecessary scrap, and the like move are indicated by outlined white arrows.

The sheet manufacturing apparatus 1 manufactures the sheet P3 from the used paper C. In the sheet manufacturing apparatus 1, the first unit group 101, the third unit group 103, and the second unit group 102 are arranged from a −Y direction to a +Y direction in side view in a −X direction.

The used paper C is transported from the first unit group 101 to the second unit group 102 through a pipe 21 crossing inside the third unit group 103. Then, the used paper C is subjected to defibration and the like in the second unit group 102 to become fibers, and the fibers then become a mixture containing a binder and the like. The mixture is transported to the third unit group 103 through a pipe 24. The mixture is formed into a web W in the third unit group 103 and then formed into a belt-shaped sheet P1. The belt-shaped sheet P1 is cut into the sheet P3 in the first unit group 101.

The first unit group 101 includes a buffer tank 13, a fixed-quantity supply unit 15, a merging unit 17, and the pipe 21. In the first unit group 101, these components are arranged in the above order from upstream to downstream. The first unit group 101 also includes a first cutting unit 81, a second cutting unit 82, a tray 91, and a shredding unit 95. The first cutting unit 81 and the second cutting unit 82 cut the belt-shaped sheet P1 into the sheet P3 having a predetermined shape. Further, the first unit group 101 includes a water supply unit 67. The water supply unit 67 is a water storage tank. The water supply unit 67 supplies water for humidification to each of a first humidifying unit 65 and a second humidifying unit 66, which will be described later, through a water supply pipe (not illustrated).

The used paper C is fed from a raw material input port 11 to the buffer tank 13. The used paper C contains fibers such as cellulose, and includes, for example, paper pieces of shredded used paper. The humidified air is supplied to the inside of the buffer tank 13 from the second humidifying unit 66 provided in the third unit group 103.

The used paper C to be defibrated is temporarily stored in the buffer tank 13 and then transported to the fixed-quantity supply unit 15 in accordance with the operation of the sheet manufacturing apparatus 1. The sheet manufacturing apparatus 1 may be provided with a shredder for shredding the used paper C and the like upstream of the buffer tank 13.

The fixed-quantity supply unit 15 includes a weighing device **15*a* and a supply mechanism (not illustrated). The weighing device 15*a* weighs mass of the used paper C. The supply mechanism supplies the used paper C weighed by the weighing device 15*a* to the downstream merging unit 17. That is, the fixed-quantity supply unit 15 weighs the used paper C for each predetermined mass by the weighing device 15*a*, and supplies the used paper C to the downstream merging unit 17** by the supply mechanism.

Either digital or analog weighing mechanism can be applied to the weighing device **15*a*. Specifically, examples of the weighing device 15*a* include a physical sensor such as a load cell, a spring scale, and a balance. In the present embodiment, the load cell is used as the weighing device 15*a*. The predetermined mass for which the weighing device 15*a*** weighs the used paper C is, for example, about several grams to several tens of grams.

A known technique such as a vibration feeder can be applied to the supply mechanism. The supply mechanism may be included in the weighing device **15*a***.

The weighing and supply of the used paper C in the fixed-quantity supply unit 15 is a batch process. That is, the supply of the used paper C from the fixed-quantity supply unit 15 to the merging unit 17 is intermittently performed. The fixed-quantity supply unit 15 may include a plurality of weighing devices **15*a*, and the plurality of weighing devices 15*a*** may be operated at different times to improve efficiency of weighing.

In the merging unit 17, shredded pieces of the slit piece S supplied from the shredding unit 95 are merged and mixed with the used paper C supplied from the fixed-quantity supply unit 15. The slit piece S and the shredding unit 95 will be described later. The used paper C mixed with the shredded pieces flows into the pipe 21 from the merging unit 17.

The pipe 21 transports the used paper C from the first unit group 101 to the second unit group 102 by airflow generated by a blower (not illustrated).

The second unit group 102 includes a defibrating unit 31 which is a dry defibrating machine, a separating unit 32, a pipe 23, a mixing unit 33, and the pipe 24. In the second unit group 102, these components are arranged in the above order from upstream to downstream. The second unit group 102 also includes a pipe 25 coupled to the separating unit 32, a collecting unit 35, a compressor 38, and a power supply unit 39.

The used paper C transported through the pipe 21 flows into the defibrating unit 31. The defibrating unit 31 defibrates the used paper C supplied from the fixed-quantity supply unit 15 into fibers in a dry process. A known defibrating mechanism can be applied to the defibrating unit 31.

The defibrating unit 31 includes the following configuration, for example. The defibrating unit 31 includes a stator and a rotor. The stator has a substantially cylindrical inner side surface. The rotor is installed inside the stator and rotates along the inner side surface of the stator. Small pieces of the used paper C are pinched between the inner side surface of the stator and the rotor, and are defibrated by shearing force generated therebetween. As a result, entangled fibers contained in paper pieces of the used paper C are untangled. The used paper C is formed into fibers and transported to the separating unit 32.

The separating unit 32 separates the defibrated fibers. Specifically, the separating unit 32 removes components which are included in the fibers and are unnecessary for manufacturing the sheet P3. Specifically, the separating unit 32 separates relatively long fibers from relatively short fibers. Since relatively short fibers may cause a decrease in strength of the sheet P3, the fibers are separated by the separating unit 32. In addition, the separating unit 32 also separates and removes coloring materials and additives contained in the used paper C. A known technique such as a disk mesh method can be applied to the separating unit 32.

The humidified air is supplied from the second humidifying unit 66 of the third unit group 103 to the inside of the separating unit 32.

Relatively short fibers and the like are removed from the defibrated fibers, and the defibrated fibers are transported to the mixing unit 33 through the pipe 23. Unnecessary components such as relatively short fibers and coloring materials are discharged to the collecting unit 35 through the pipe 25.

The mixing unit 33 mixes the fibers with a binder and the like in the air to form a mixture. Although not illustrated, the mixing unit 33 includes a flow path through which the fibers are transported, a fan, a hopper, a supply pipe, and a valve.

The hopper communicates with the flow path of the fibers through the supply pipe. The valve is provided to the supply pipe between the hopper and the flow path. The hopper supplies a binder such as starch into the flow path. The valve adjusts mass of the binder supplied from the hopper to the flow path. Thus, the mixing ratio of the fibers and the binder is adjusted.

In addition to the above-described configuration for supplying the binder, the mixing unit 33 may include a similar configuration for supplying a coloring material, an additive, or the like.

The fan of the mixing unit 33 generates airflow to mix the binder and the like with the fibers in the air to form a mixture while the fibers are transported downstream. The mixture flows into the pipe 24 from the mixing unit 33.

The collecting unit 35 includes a filter (not illustrated). The filter filters out unnecessary components such as relatively short fibers transported through the pipe 25 by the airflow.

The compressor 38 generates compressed air. In the filter, clogging may occur due to fine particles or the like in the unnecessary components. The compressed air generated by the compressor 38 can be blown onto the filter to blow off adhering particles and perform cleaning of the filter.

The power supply unit 39 includes a control unit 5 and a power supply device (not illustrated) that supplies power to the sheet manufacturing apparatus 1. The power supply unit 39 distributes power supplied from the outside to each of the components of the sheet manufacturing apparatus 1. The control unit 5 is electrically coupled to each of the components of the sheet manufacturing apparatus 1, and integrally controls the operation of these components.

The third unit group 103 accumulates and compresses the mixture containing the fibers, and forms the mixture into the belt-shaped sheet P1 which is recycled paper. The third unit group 103 includes an accumulation unit 50, a first transport unit 61, a second transport unit 62, the first humidifying unit 65, the second humidifying unit 66, a drain unit 68, a forming unit 70, and cleaning units 41 and 42.

In the third unit group 103, the accumulation unit 50, the first transport unit 61, the second transport unit 62, the first humidifying unit 65, the forming unit 70, and the cleaning units 41 and 42 are arranged in this order from upstream to downstream. The second humidifying unit 66 is arranged below the first humidifying unit 65.

The accumulation unit 50 generates the web W by accumulating the mixture containing the separated fibers in the air. The accumulation unit 50 includes a drum member 53, a blade member 55 installed in the drum member 53, a housing 51 that accommodates the drum member 53, and a suction unit 59. The mixture is taken into the drum member 53 from the pipe 24.

The first transport unit 61 is arranged below the accumulation unit 50. The first transport unit 61 includes a mesh belt 61*a* and five stretch rollers (not illustrated) for stretching the mesh belt 61*a*. The suction unit 59 faces the drum member 53 with the mesh belt 61*a* interposed therebetween in the direction along the Z-axis.

The blade member 55 is arranged inside the drum member 53 and is rotationally driven by a motor (not illustrated). The drum member 53 is a semi-columnar sieve. A net having a function of the sieve is provided on a side surface of the drum member 53 facing downward. The drum member 53 causes particles of fibers and mixtures smaller than the size of the mesh of the sieve to pass through from the inside to the outside.

The mixture is discharged to the outside of the drum member 53 while being stirred by the rotating blade member 55 in the drum member 53. The humidified air is supplied from the second humidifying unit 66 to the inside of the drum member 53.

The suction unit 59 is arranged below the drum member 53. The suction unit 59 sucks the air in the housing 51 through a plurality of holes of the mesh belt 61*a*. The plurality of holes of the mesh belt 61*a* cause air to pass therethrough, but do not cause fibers, a binder, and the like contained in the mixture to pass therethrough easily. Thus, the mixture discharged to the outside of the drum member 53 is sucked downward together with the air. The suction unit 59 is a known suction device such as a blower.

The mixture is dispersed in the air in the housing 51 and accumulated on an upper surface of the mesh belt 61*a* by gravity and suction of the suction unit 59 to form the web W.

The mesh belt 61*a* is an endless belt and is stretched by the five stretch rollers. The mesh belt 61*a* is rotated counterclockwise in FIG. 1 by the rotation of the stretch rollers. As a result, the mixture is continuously accumulated on the mesh belt 61*a* to form the web W. The web W contains a relatively large amount of air and is soft and swollen. The first transport unit 61 transports the formed web W downstream by a rotational move of the mesh belt 61*a*.

The second transport unit 62 transports the web W in place of the first transport unit 61 downstream of the first transport unit 61. The second transport unit 62 peels the web W off from the upper surface of the mesh belt 61*a* and transports the web W toward the forming unit 70. The second transport unit 62 is arranged above the transport path of the web W and slightly upstream of a starting point of a return section of the mesh belt 61*a*. The second transport unit 62 in the +Y direction and the mesh belt 61*a* in the −Y direction partially overlap in the vertical direction.

The second transport unit 62 includes a transport belt, a plurality of rollers, and a suction mechanism, which are not illustrated. The transport belt is provided with a plurality of holes through which air passes. The transport belt is stretched by the plurality of rollers and is rotationally moved by the rotation of the rollers.

The second transport unit 62 causes an upper surface of the web W to be attracted to a surface of the transport belt below by negative pressure generated by the suction mechanism. When the transport belt rotationally moves in this state, the web W is attracted to the transport belt and transported downstream.

The first humidifying unit 65 humidifies the web W containing fibers accumulated in the accumulation unit 50 of the third unit group 103. Specifically, the first humidifying unit 65 is, for example, a mist humidifier, and humidifies the web W transported by the second transport unit 62, by supplying mist M from below. The first humidifying unit 65 is arranged below the second transport unit 62 and faces the web W transported by the second transport unit 62 in the direction along the Z-axis. For example, a known humidifying device such as an ultrasonic type can be applied to the first humidifying unit 65.

By humidifying the web W with the mist M, the function of the starch as a binder is promoted, and strength of the sheet P3 is improved. In addition, since the web W is humidified from below, drops derived from the mist are prevented from falling onto the web W. Further, since the web W is humidified from the side opposite to the contact surface between the transport belt and the web W, sticking of the web W with respect to the transport belt is reduced. The second transport unit 62 transports the web W to the forming unit 70.

The forming unit 70 includes processing rollers 71 and 72. The processing rollers 71 and 72 process the web W containing fibers to form the belt-shaped sheet P1. The processing rollers 71 and 72 form a pair, each of which has an electric heater built therein and has a function of raising a temperature of a roller surface.

Each of the processing rollers 71 and 72 is a substantially columnar member. A rotation shaft of the processing roller 71 and a rotation shaft of the processing roller 72 are arranged along an X-axis. The processing roller 71 is arranged substantially above the transport path of the web W, and the processing roller 72 is arranged substantially below the transport path of the web W. Between a side surface of the processing roller 71 and a side surface of the processing roller 72, a gap corresponding to the thickness of the sheet P3 to be manufactured is provided.

The processing rollers 71 and 72 are rotationally driven by a stepping motor (not illustrated). The web W is pinched between the processing roller 71 and the processing roller 72 and fed downstream while being heated and pressurized. That is, the web W continuously passes through the forming unit 70, and is press-formed while being heated. By using the processing rollers 71 and 72 as a pair of forming members, the web W can be efficiently heated and pressurized.

The web W, by passing through the forming unit 70, changes from a soft state in which the web W contains a relatively large volume of air to have reduced air therein, and at the same time the fibers of the web W are bonded to each other by the binder, whereby the web W is formed into the belt-shaped sheet P1. The belt-shaped sheet P1 is transported to the first unit group 101 by a transport roller (not illustrated).

The cleaning unit 41 corresponds to the processing roller 71, and the cleaning unit 42 corresponds to the processing roller 72. The cleaning unit 41 and the control unit 5 constitute a cleaning device 401 to be described later. The cleaning unit 42 and the control unit 5 constitute a cleaning device 402 to be described later.

As described above, the processing rollers 71 and 72 perform processing by pinching the web W. Therefore, paper dust, fibers, and the like derived from the used paper C contained in the web W are likely to adhere to each of the side surfaces of the processing rollers 71 and 72. When the forming is continued while the processing rollers 71 and 72 are contaminated with the paper dust and the like adhering thereto, defects such as contamination or roughness of the surface or a decrease in sheet strength may occur in the sheet P3 to be manufactured. The cleaning unit 41 cleans the processing roller 71, and the cleaning unit 42 cleans the processing roller 72.

The second humidifying unit 66 is arranged below the first humidifying unit 65. A known vaporization type humidifying device can be applied to the second humidifying unit 66. Examples of the vaporization type humidifying device include a humidifying device that generates humidified air by blowing air to a wetted nonwoven fabric or the like to vaporize moisture.

The second humidifying unit 66 humidifies a predetermined region of the sheet manufacturing apparatus 1. The predetermined region is one or more of the buffer tank 13, the separating unit 32, and the inside of the drum member 53 of the accumulation unit 50. Specifically, the humidified air is supplied from the second humidifying unit 66 to the above-described region through a plurality of pipes (not illustrated). The humidified air suppresses charging of the used paper C, fibers, and the like in each of the above-described configurations, and suppresses adhesion of the used paper C, fibers, and the like to members due to static electricity.

The drain unit 68 is a drain tank. The drain unit 68 collects and stores old moisture that is used in the first humidifying unit 65, the second humidifying unit 66, and the like. The drain unit 68 can be removed from the sheet manufacturing apparatus 1 as necessary, and the accumulated water can be discarded.

The belt-shaped sheet P1 transported to the first unit group 101 reaches the first cutting unit 81. The first cutting unit 81 cuts the belt-shaped sheet P1 in the direction intersecting the transport direction, for example, in the direction along the X-axis. The belt-shaped sheet P1 is cut into a single-cut shape sheet P2 by the first cutting unit 81. The single-cut shape sheet P2 is transported from the first cutting unit 81 to the second cutting unit 82.

The second cutting unit 82 cuts the single-cut shape sheet P2 in the transport direction, for example, in the direction along a Y-axis. Specifically, the second cutting unit 82 cuts the single-cut shape sheet P2 in the vicinity of both sides in the direction along the X-axis. As a result, the single-cut shape sheet P2 becomes the sheet P3 having a predetermined shape such as A4 size or A3 size.

When the single-cut shape sheet P2 is cut into the sheet P3 in the second cutting unit 82, the slit piece S, which is a scrap, is produced. The slit piece S is transported substantially in the −Y direction and reaches the shredding unit 95 which is a shredder. The shredding unit 95 shreds the slit piece S and supplies the slit piece S as shredded pieces to the merging unit 17. A mechanism for weighing and supplying the shredded pieces of the slit piece S to the merging unit 17 may be installed between the shredding unit 95 and the merging unit 17.

The sheet P3 is transported substantially upward and stacked on the tray 91. As described above, the sheet P3 is manufactured by the sheet manufacturing apparatus 1. The sheet P3 can be applied as a substitute for copy paper, for example.

Figure 2:
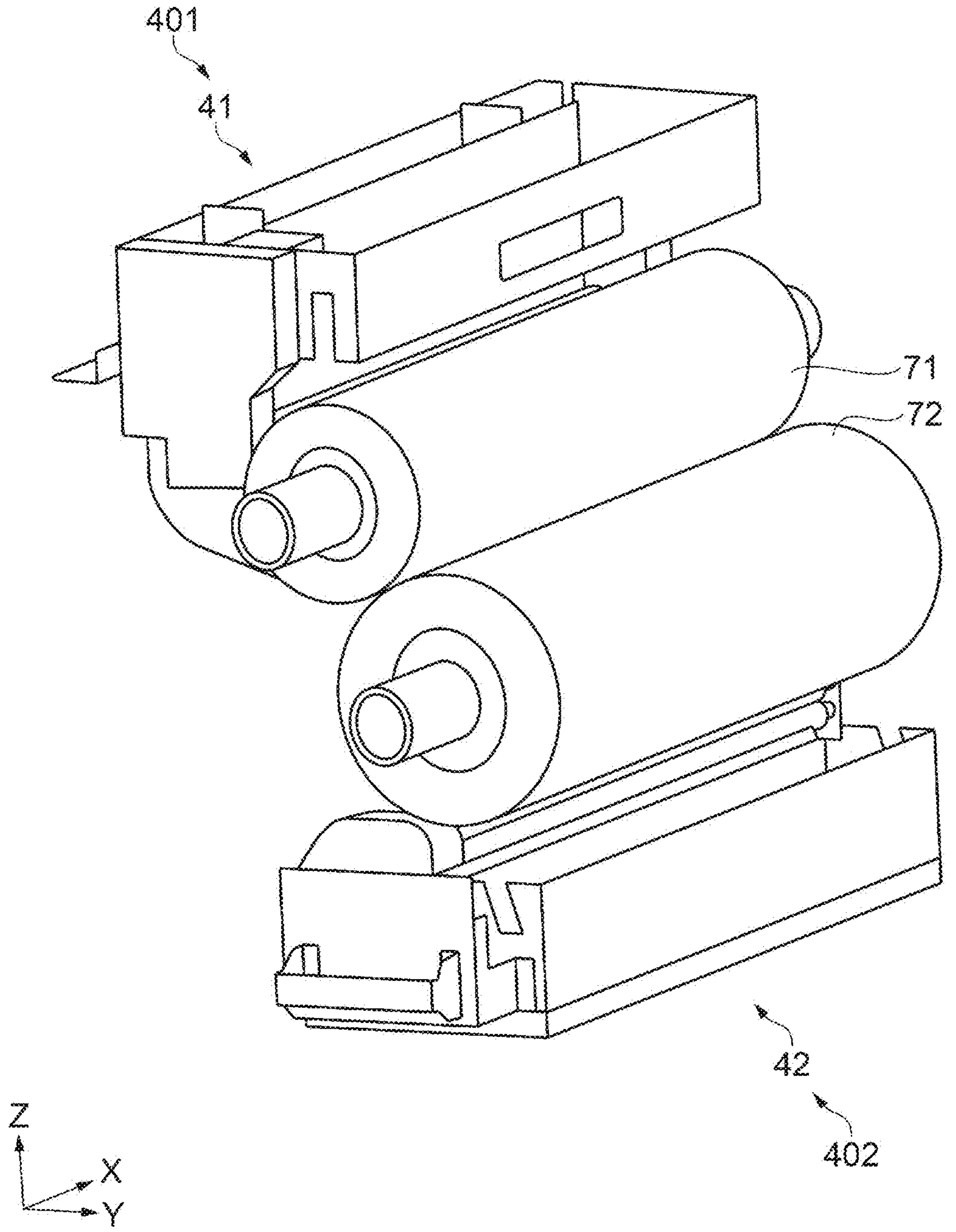
FIG. 2 is a perspective view illustrating arrangement of a forming unit and a cleaning unit.

As illustrated in FIG. 2, the cleaning unit 41 is arranged slightly higher than the processing roller 71 in the −Y direction and along the processing roller 71. The cleaning unit 42 is arranged lower than the processing roller 72 and nearer to the −Y direction along the processing roller 72.

The cleaning device 401 includes the control unit 5 described above and the cleaning unit 41. The cleaning device 402 includes the control unit 5 and the cleaning unit

42. Note that each of the cleaning devices 401 and 402 may individually include a control unit.

In the direction along the X-axis, the length of the cleaning unit 41 is substantially equal to the length of the side surface of the processing roller 71. Similarly, the length of the cleaning unit 42 is substantially equal to the length of the processing roller 72.

Figure 3:
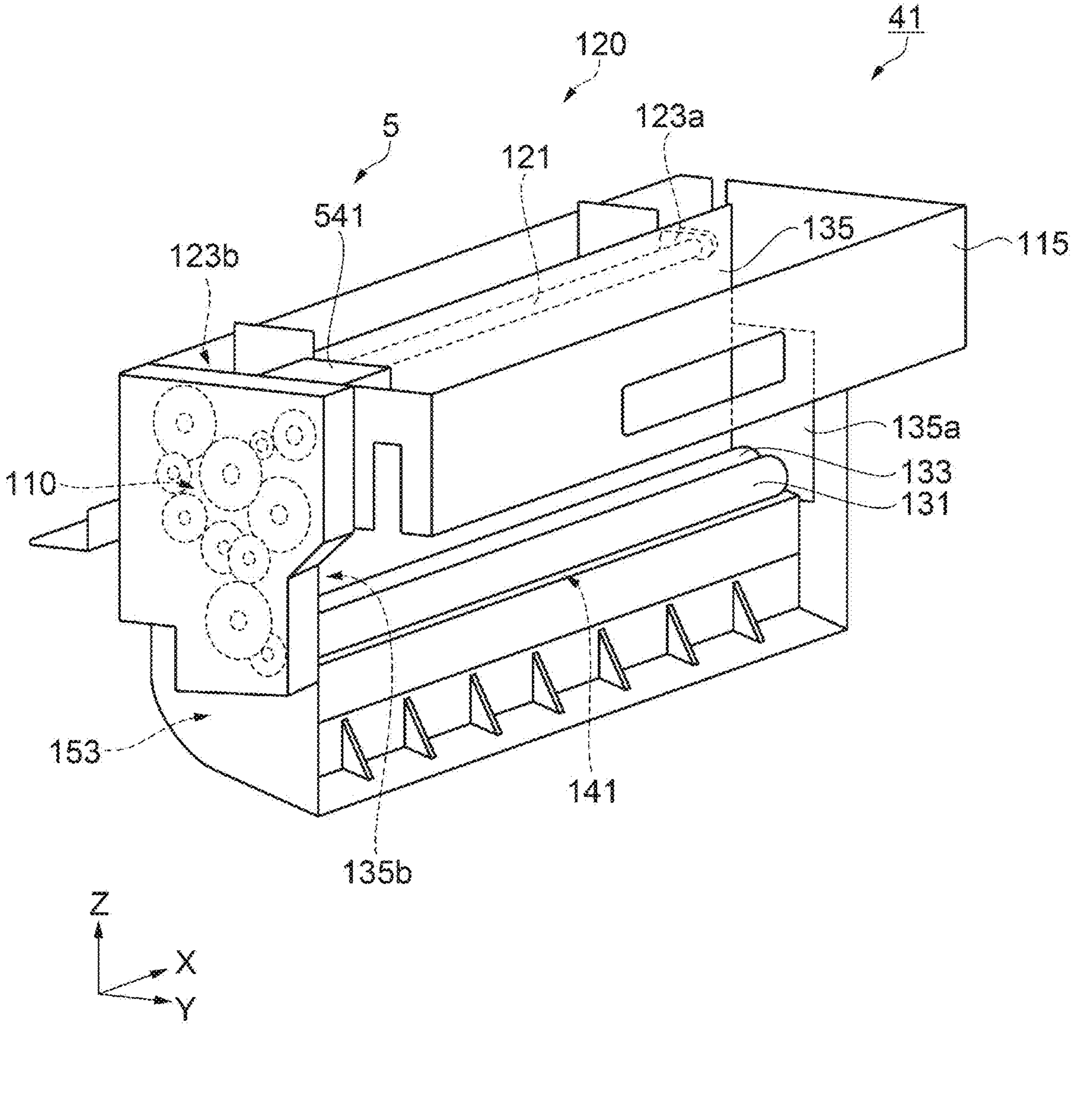
FIG. 3 is a perspective view illustrating a configuration of a cleaning unit of a first cleaning device.

As illustrated in FIG. 3, the cleaning unit 41 includes a first processing unit 131, a third processing unit 133, a blade unit 141, a second processing unit 120, a gear group 110, a paper dust collecting unit 153, a support member 135, and a frame unit 115. The cleaning unit 41 also includes a fourth processing unit 144 to be described later. Note that, in FIG. 3, a driving unit 541 which is an electric motor included in the control unit 5 is also illustrated.

The first processing unit 131 cleans the processing roller 71. The third processing unit 133 cleans the first processing unit 131. The blade unit 141 cleans the third processing unit 133.

The first processing unit 131 is a substantially columnar roller-shaped member, and the height direction of the column is arranged along the X-axis. Both end portions of the first processing unit 131 in the direction along the X-axis are supported by the support member 135, and the first processing unit 131 rotates about a rotation shaft along the X-axis. The rotation of the first processing unit 131 is driven by the driving unit 541.

The third processing unit 133 is a substantially columnar roller-shaped member and is arranged side by side with the first processing unit 131 in the direction along the Y-axis, and the height direction of the column is also arranged along the X-axis. Both end portions of the third processing unit 133 in the direction along the X-axis are supported by the support member 135, and the third processing unit 133 rotates about a rotation shaft along the X-axis. The rotation of the third processing unit 133 is also driven by the driving unit 541.

The blade unit 141 extends along a side surface of the third processing unit 133. The blade unit 141 is supported by the support member 135. The blade unit 141 is cleaned by the fourth processing unit 144 (not illustrated).

The second processing unit 120 separates the first processing unit 131 from the processing roller 71. The second processing unit 120 includes a shaft unit 121 and cam members 123*a* and 123*b*. The shaft unit 121 is a rod-shaped member arranged along the X-axis. The cam member 123*a* is mounted in the vicinity of an end portion of the shaft unit 121 in a +X direction, and the cam member 123*b* is mounted in the vicinity of an end portion of the shaft unit 121 in the −X direction.

The shaft unit 121 is supported by the frame unit 115 and rotates about a rotation shaft along the X-axis. The end portion of the shaft unit 121 in the −X direction is directly coupled to one of the gears of the gear group 110. When the gear group 110 is driven, the shaft unit 121 is rotationally driven. The cam members 123*a* and 123*b* rotate about the shaft unit 121 as the rotation center in conjunction with the rotation of the shaft unit 121.

The gear group 110 includes a plurality of gears that are not illustrated. The plurality of gears are rotated by driving of the driving unit 541 to rotate the shaft unit 121, the first processing unit 131, and the third processing unit 133. The gear group 110 and the driving unit 541 are installed at an end portion of the frame unit 115 in the −X direction.

The support member 135 includes, in plan view from above, a main body (not illustrated) along an XZ-plane and support units 135*a* and 135*b* protruding in the +Y direction from respective end portions of the main body in the direction along the X-axis. The support units 135*a* and 135*b* face each other in the direction along the X-axis. The second processing unit 120, the first processing unit 131, the third processing unit 133, and the blade unit 141 are arranged between the support units 135*a* and 135*b*. That is, the support units 135*a* and 135*b* support the second processing unit 120, the first processing unit 131, the third processing unit 133, and the blade unit 141.

The support member 135 can change its posture relative to the frame unit 115 while being supported by the frame unit 115. The posture change of the support member 135 will be described later.

The frame unit 115 is a substantially frame-shaped member in plan view from above, and the support member 135 is arranged in the inner side thereof. The gear group 110 is arranged in the −X direction, which is outside, and the driving unit 541 is arranged in the +X direction, which is inside, relative to the end portion in the −X direction of the frame unit 115. The driving unit 541 includes an output shaft. The output shaft extends in the −X direction through the frame unit 115 and is directly coupled to one of the plurality of gears of the gear group 110. The frame unit 115 is supported by the frame of the third unit group 103 of the sheet manufacturing apparatus 1.

The rotation directions of the normal rotation and the reverse rotation of the driving unit 541 are controlled by the control unit 5 described above. Thus, the cleaning of the processing roller 71 by the first processing unit 131 and the contact and separation of the first processing unit 131 with and from the processing roller 71 are switched. The contact and separation of the first processing unit 131 will be described later.

Figure 4:
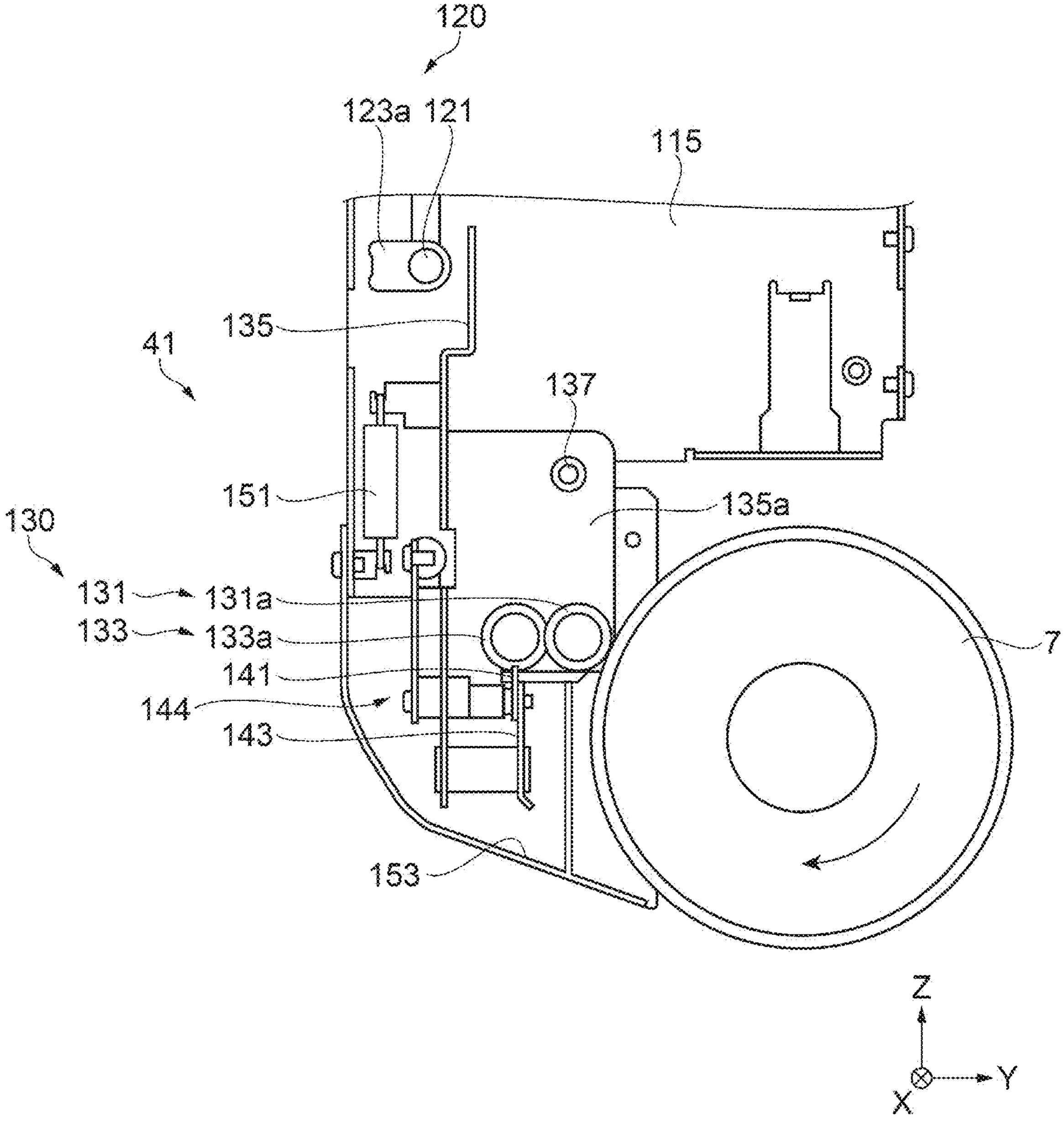
FIG. 4 is a side view illustrating the configuration of the cleaning unit of the first cleaning device.

As illustrated in FIG. 4, in the cleaning unit 41, the first processing unit 131 is arranged slightly higher than the processing roller 71 while being in contact therewith in the −Y direction. FIG. 4 illustrates a state in which the first processing unit 131 is in contact with the processing roller 71 to clean the side surface of the processing roller 71. Here, in the description of FIG. 4, a state in side view in the −X direction will be described unless otherwise specified.

As described above, the first processing unit 131 cleans the processing roller 71. The first processing unit 131 includes a cleaning layer 131*a* on the outer periphery portion of the side surface. The cleaning layer 131*a* comes into contact with the side surface of the processing roller 71 to clean the side surface of the processing roller 71.

The cleaning layer 131*a* cleans the paper dust and the like adhering to the processing roller 71. Therefore, the cleaning ability of the first processing unit 131 with respect to the processing roller 71 is improved.

The cleaning layer 131*a* is made of a felt material. Therefore, the paper dust and the like are easily entangled in the cleaning layer 131*a*. In addition, the cleaning layer 131*a* easily follows the shape of the side surface of the processing roller 71. Thus, the cleaning ability of the first processing unit 131 to clean the processing roller 71 is further improved.

The third processing unit 133 forms a roller pair 130 with the first processing unit 131, and cleans the first processing unit 131. Specifically, the third processing unit 133 includes a brush-like surface layer 133*a* on the outer periphery portion of the side surface. In the surface layer 133*a*, a plurality of bristle materials are installed substantially radially from the rotation center. The cleaning layer 131*a* of the first processing unit 131 and the surface layer 133*a* are arranged so as to overlap each other. As a result, the surface layer 133*a* comes into contact with the cleaning layer 131*a* of the first processing unit 131 to clean the first processing unit 131.

The paper dust and the like transferred from the processing roller 71 to the first processing unit 131 are cleaned by the surface layer 133*a*, and the cleanliness of the first processing unit 131 is maintained. Therefore, the cleaning ability of the first processing unit 131 with respect to the processing roller 71 is easily maintained.

The processing roller 71, the first processing unit 131, and the third processing unit 133 rotate clockwise. In particular, the first processing unit 131 comes into contact with the processing roller 71 while rotating clockwise, which is the same direction as the processing roller 71, and cleans the processing roller 71. Therefore, the surfaces of the processing roller 71 and the first processing unit 131 slide in opposite directions in a region where the processing roller 71 and the first processing unit 131 are in contact with each other. Therefore, the paper dust and the like adhering to the surface of the processing roller 71 are easily scraped off and removed by the cleaning layer 131*a* of the first processing unit 131. As a result, the cleaning ability of the first processing unit 131 with respect to the processing roller 71 is further improved.

The blade unit 141 is arranged below the third processing unit 133. The blade unit 141 is a substantially rectangular plate-shaped member, and a principal surface thereof extends along the XZ-plane. The blade unit 141 comes into contact with the surface layer 133*a* of the third processing unit 133 and cleans the surface layer 133*a*. In the direction along the X-axis, the length of the blade unit 141 is substantially equal to the length of the surface layer 133*a* of the third processing unit 133.

The blade unit 141 is supported by the support member 135 with a fixing member 143 interposed therebetween, and is arranged such that an upper end portion thereof is embedded in the plurality of bristle materials of the surface layer 133*a*. A distance to embed the blade unit 141 with respect to the surface layer 133*a* is, for example, substantially 1 mm. The fourth processing unit 144 is arranged substantially in the −Y direction of the blade unit 141.

In the third processing unit 133, the paper dust and the like transferred from the first processing unit 131 are cleaned by the blade unit 141, thereby maintaining cleanliness. Therefore, the cleaning ability of the first processing unit 131 and the third processing unit 133 with respect to the processing roller 71 is easily maintained.

The support member 135 is rotatably supported by the frame unit 115 with a rotation shaft 137 as the rotation center. A spring member 151 is arranged along the Z-axis in the −Y direction of the support member 135. In the spring member 151, an upper end portion is fixed to the support member 135, and a lower end portion is fixed to the frame unit 115.

The support member 135 is biased by the spring member 151 in the counterclockwise direction with the rotation shaft 137 as the rotation center. Therefore, the first processing unit 131 is brought into contact with the processing roller 71 by biasing force of the spring member 151.

The second processing unit 120 is arranged in the −Y direction with respect to an upper end portion of the support member 135 and faces the support member 135 in the direction along the Y-axis. The cam member 123*a* and the cam member 123*b* (not illustrated) are rotated under the control of the control unit 5, and switch between contact and separation of the first processing unit 131 with and from the processing roller 71.

Thus, the first processing unit 131 can be appropriately separated from the processing roller 71. Compared to when the first processing unit 131 is constantly in contact with the processing roller 71, the occurrence of wear and deformation of the cleaning layer 131*a* in the first processing unit 131 is suppressed. Note that, the processing of the web W described above is performed when the first processing unit 131 is in contact with the processing roller 71.

Each of the cam members 123*a* and 123*b* has an asymmetric shape with respect to the shaft unit 121 serving as the rotation center, and has a protruding portion (not illustrated). When the first processing unit 131 is brought into contact with the processing roller 71, the protruding portion is moved in a direction substantially opposite to the upper end portion of the support member 135 to separate the cam members 123*a* and 123*b* from the upper end portion of the support member 135.

When the first processing unit 131 is separated from the processing roller 71, the shaft unit 121 rotates and the protruding portion comes into contact with the upper end of the support member 135. Therefore, the protruding portion biases the upper end portion substantially in the +Y direction, and the support member 135 rotates clockwise by a certain distance. As a result, the support member 135 changes its posture, and the first processing unit 131 is separated from the processing roller 71.

The paper dust collecting unit 153 is arranged below the third processing unit 133 and the blade unit 141. The paper dust collecting unit 153 is a box-shaped member whose upper side is opened, and mainly collects and stores the paper dust and the like falling from the third processing unit 133 and the blade unit 141. The paper dust and the like stored in the paper dust collecting unit 153 can be removed by detaching the paper dust collecting unit 153 from the sheet manufacturing apparatus 1.

Figure 5:
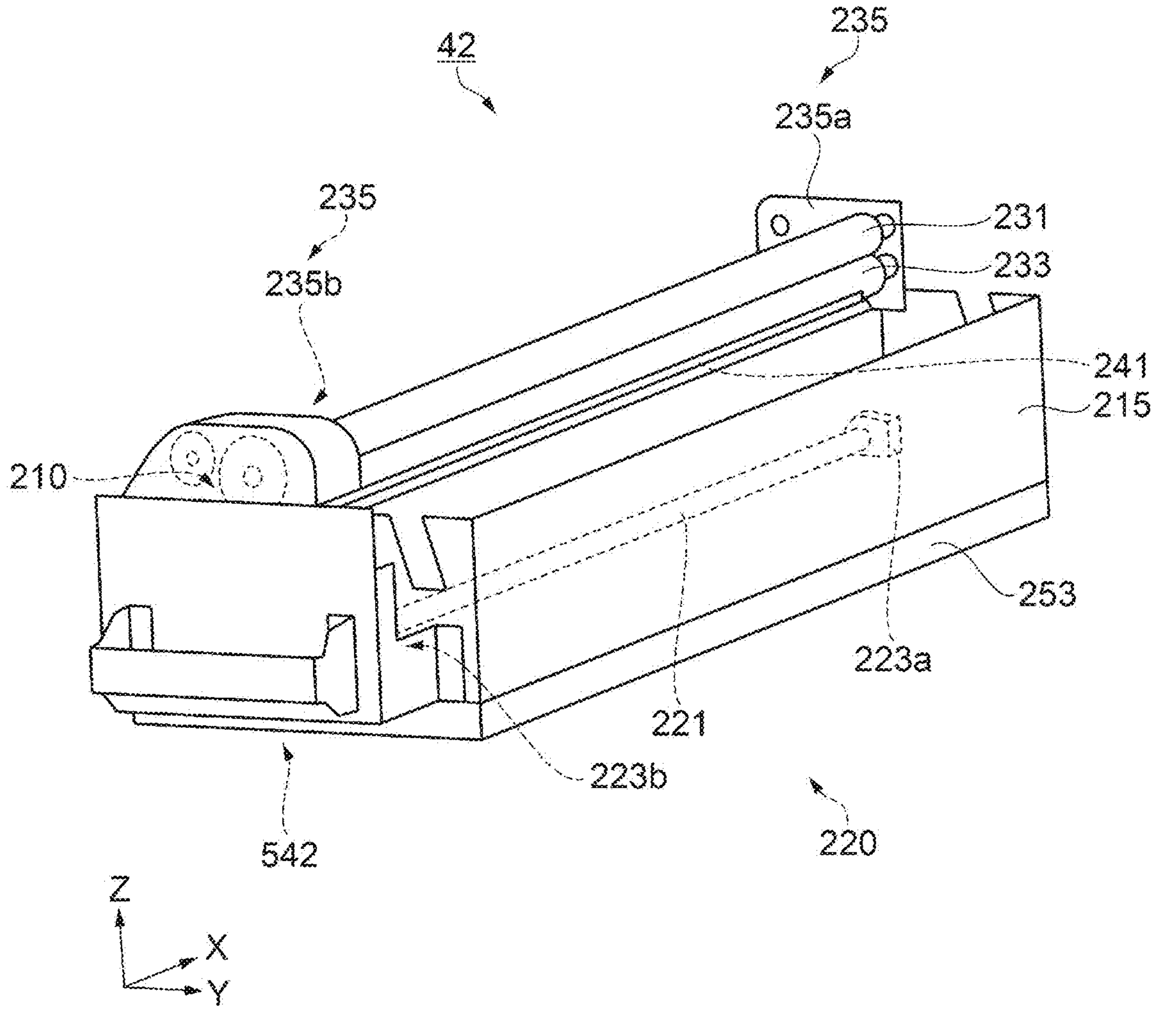
FIG. 5 is a perspective view illustrating a configuration of a cleaning unit of a second cleaning device.

As illustrated in FIG. 5, the cleaning unit 42 includes a first processing unit 231, a third processing unit 233, a blade unit 241, a second processing unit 220, a gear group 210, a paper dust collecting unit 253, a support member 235, and a frame unit 215. The cleaning unit 42 also includes a fourth processing unit 244 to be described later. Note that, in FIG. 5, a driving unit 542, which is an electric motor included in the control unit 5, is also illustrated.

The first processing unit 231 cleans the processing roller 72. The third processing unit 233 cleans the first processing unit 231. The blade unit 241 cleans the third processing unit 233.

The first processing unit 231 is a substantially columnar roller-shaped member, and the height direction of the column is arranged along the X-axis. Both end portions of the first processing unit 231 in the direction along the X-axis are supported by the support member 235, and the first processing unit 231 rotates about a rotation shaft along the X-axis. The rotation of the first processing unit 231 is driven by the driving unit 542.

The third processing unit 233 is a substantially columnar roller-shaped member and is arranged side by side with the first processing unit 231 in the direction along the Z-axis, and the height direction of the column is arranged along the X-axis. Both end portions of the third processing unit 233 in the direction along the X-axis are supported by the support member 235, and the third processing unit 233 rotates about a rotation shaft along the X-axis. The rotation of the third processing unit 233 is also driven by the driving unit 542.

The blade unit 241 extends along a side surface of the third processing unit 233. The blade unit 241 is supported by the support member 235. The blade unit 241 is cleaned by the fourth processing unit 244 (not illustrated).

The second processing unit 220 separates the first processing unit 231 from the processing roller 72. The second processing unit 220 includes a shaft unit 221 and cam members 223*a* and 223*b*. The shaft unit 221 is a rod-shaped member arranged along the X-axis. In the shaft unit 221, the cam member 223*a* is mounted in the vicinity of an end portion in the +X direction, and the cam member 223*b* is mounted in the vicinity of an end portion in the −X direction.

The shaft unit 221 is supported by the frame unit 215 and rotates about a rotation shaft along the X-axis. The end portion of the shaft unit 221 in the −X direction is directly coupled to one of the gears of the gear group 210. When the gear group 210 is driven, the shaft unit 221 is rotationally driven. The cam members 223*a* and 223*b* rotate about the shaft unit 221 as the rotation center in conjunction with the rotation of the shaft unit 221.

The gear group 210 includes a plurality of gears that are not illustrated. The plurality of gears are rotated by driving of the driving unit 542 to rotate the shaft unit 221, the first processing unit 231, and the third processing unit 233. The gear group 210 and the driving unit 542 are installed at an end portion of the frame unit 215 in the −X direction.

The support member 235 includes, in plan view from above, a main body (not illustrated) along the XZ-plane and support units 235*a* and 235*b* protruding upward from respective end portions of the main body in the direction along the X-axis. The support units 235*a* and 235*b* face each other in the direction along the X-axis. The second processing unit 220, the first processing unit 231, the third processing unit 233, and the blade unit 241 are arranged between the support units 235*a* and 235*b*. That is, the support units 235*a* and 235*b* support the second processing unit 220, the first processing unit 231, the third processing unit 233, and the blade unit 241.

The support member 235 can change its posture relative to the frame unit 215 while being supported by the frame unit 215. The posture change of the support member 235 will be described later.

The frame unit 215 is a substantially frame-shaped member in plan view from above, and the support member 235 is arranged inside the frame unit 215. The gear group 210 is arranged in the −X direction, which is outside, and the driving unit 542 is arranged in the +X direction, which is inside, relative to the end portion in the −X direction of the frame unit 215. The driving unit 542 includes an output shaft. The output shaft extends in the −X direction through the frame unit 215 and is directly coupled to one of the plurality of gears of the gear group 210. The frame unit 215 is supported by the frame of the third unit group 103 of the sheet manufacturing apparatus 1.

The rotation directions of the normal rotation and the reverse rotation of the driving unit 542 are controlled by the control unit 5 described above. As a result, the cleaning of the processing roller 72 by the first processing unit 231 and the contact and separation of the first processing unit 231 with and from the processing roller 72 are switched. Details of cleaning and switching between contact and separation will be described later.

Figure 6:
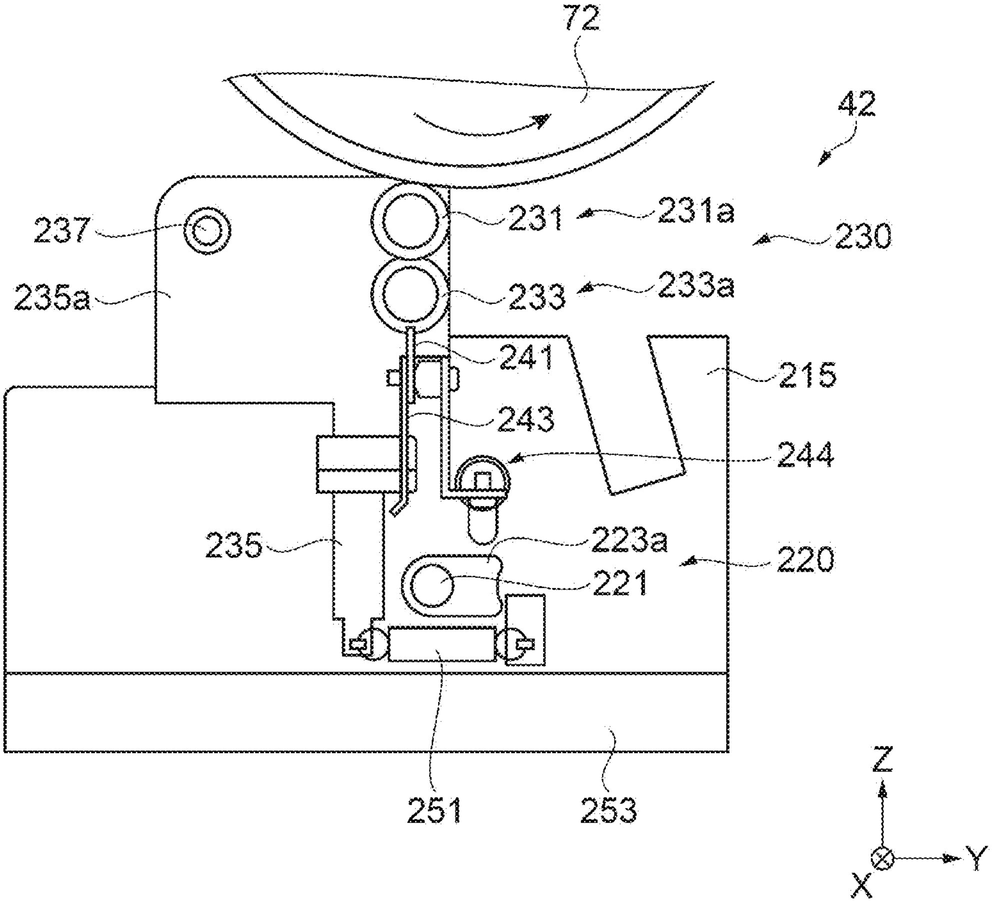
FIG. 6 is a side view illustrating the configuration of the cleaning unit of the second cleaning device.

As illustrated in FIG. 6, in the cleaning unit 42, the first processing unit 231 is arranged lower than the processing roller 72 while being in contact therewith slightly in the −Y direction. FIG. 6 illustrates a state in which the first processing unit 231 is in contact with the processing roller 72 to clean the side surface of the processing roller 72. Here, in the description of FIG. 6, a state in side view in the −X direction will be described unless otherwise specified.

As described above, the first processing unit 231 cleans the processing roller 72. Specifically, the first processing unit 231 includes a cleaning layer 231*a* on the outer periphery portion of the side surface. The cleaning layer 231*a* comes into contact with the side surface of the processing roller 72 to clean the side surface of the processing roller 72.

The paper dust and the like adhering to the processing roller 72 are cleaned by the cleaning layer 231*a*. Therefore, the cleaning ability of the first processing unit 231 with respect to the processing roller 72 is improved.

The cleaning layer 231*a* is made of a felt material. Therefore, the paper dust and the like are easily entangled in the cleaning layer 231*a*. In addition, the cleaning layer 231*a* easily follows the shape of the side surface of the processing roller 72. Thus, the cleaning ability of the first processing unit 231 to clean the processing roller 72 is further improved.

The third processing unit 233 forms a roller pair 230 with the first processing unit 231, and cleans the first processing unit 231. Specifically, the third processing unit 233 includes a brush-like surface layer 233*a* on the outer periphery portion of the side surface. In the surface layer 233*a*, a plurality of bristle materials are installed substantially radially from the rotation center. The cleaning layer 231*a* of the first processing unit 231 and the surface layer 233*a* are arranged so as to overlap each other. As a result, the surface layer 233*a* comes into contact with the cleaning layer 231*a* of the first processing unit 231 to clean the first processing unit 231.

The paper dust and the like transferred from the processing roller 72 to the first processing unit 231 are cleaned by the surface layer 233*a*, and the cleanliness of the first processing unit 231 is maintained. Therefore, the cleaning ability of the first processing unit 231 with respect to the processing roller 72 is easily maintained.

The processing roller 72, the first processing unit 231, and the third processing unit 233 rotate counterclockwise. In particular, the first processing unit 231 comes into contact with the processing roller 72 while rotating counterclockwise, which is the same direction as the processing roller 72, and cleans the processing roller 72. Therefore, the surfaces of the processing roller 72 and the first processing unit 231 slide in opposite directions in a region where the processing roller 72 and the first processing unit 231 are in contact with each other. Therefore, the paper dust and the like adhering to the surface of the processing roller 72 are easily scraped off and removed by the cleaning layer 231*a* of the first processing unit 231. As a result, the cleaning ability of the first processing unit 231 with respect to the processing roller 72 is further improved.

The blade unit 241 is arranged below the third processing unit 233. The blade unit 241 is a substantially rectangular plate-shaped member, and a principal surface thereof extends along the XZ-plane. The blade unit 241 comes into contact with the surface layer 233*a* of the third processing unit 233 and cleans the surface layer 233*a*. In the direction along the X-axis, the length of the blade unit 241 is substantially equal to the length of the surface layer 233*a* of the third processing unit 233. The fourth processing unit 244 is arranged substantially in the +Y direction of the blade unit 241.

The blade unit 241 is supported by the support member 235 with a fixing member 243 interposed therebetween, and is arranged such that an upper end portion thereof is embedded in the plurality of bristle materials of the surface layer

233*a*. A distance to embed the blade unit 241 with respect to the surface layer 233*a* is, for example, substantially 1 mm.

The blade unit 241 cleans the third processing unit 233 to remove the paper dust and the like transferred from the first processing unit 231, thereby maintaining cleanliness. Therefore, the cleaning ability of the first processing unit 231 and the third processing unit 233 with respect to the processing roller 72 is easily maintained.

The support member 235 is rotatably supported by the frame unit 215 with a rotation shaft 237 as the rotation center. A spring member 251 is arranged along the Y-axis below the support member 235. In the spring member 251, an end portion in the −Y direction is fixed to the support member 235, and an end portion in the +Y direction is fixed to the frame unit 215.

The support member 235 is biased by the spring member 251 in the counterclockwise direction with the rotation shaft 237 as the rotation center. Therefore, the first processing unit 231 is brought into contact with the processing roller 72 by biasing force of the spring member 251.

The second processing unit 220 is arranged in the +Y direction with respect to a lower end portion of the support member 235 and faces the support member 235 in the direction along the Y-axis. The cam member 223*a* and the cam member 223*b* (not illustrated) are rotated under the control of the control unit 5, and switch between contact and separation of the first processing unit 231 with and from the processing roller 72.

Thus, the first processing unit 231 can be appropriately separated from the processing roller 72. Compared to when the first processing unit 231 is constantly in contact with the processing roller 72, the occurrence of wear and deformation of the cleaning layer 231*a* in the first processing unit 231 is suppressed. Note that the above-described processing of the web W is performed when the first processing unit 231 is in contact with the processing roller 72.

Each of the cam members 223*a* and 223*b* has an asymmetric shape with respect to the shaft unit 221 serving as the rotation center, and has a protruding portion (not illustrated). When the first processing unit 231 is brought into contact with the processing roller 72, the protruding portion is positioned in a direction substantially opposite to an upper end portion of the support member 235 to separate the cam members 223*a* and 223*b* from the lower end portion of the support member 235.

When the first processing unit 231 is separated from the processing roller 72, the shaft unit 221 rotates and the protruding portion comes into contact with the upper end portion of the support member 235. Therefore, the protruding portion biases the upper end portion substantially in the −Y direction, and the support member 235 rotates clockwise by a certain distance. As a result, the support member 235 changes its posture, and the first processing unit 231 is separated from the processing roller 72.

The paper dust collecting unit 253 is arranged below the third processing unit 233 and the blade unit 241. The paper dust collecting unit 253 is a box-shaped member whose upper side is opened, and mainly collects and stores the paper dust and the like falling from the third processing unit 233 and the blade unit 241. The paper dust and the like stored in the paper dust collecting unit 253 can be removed by detaching the paper dust collecting unit 253 from the sheet manufacturing apparatus 1.

Figure 7:
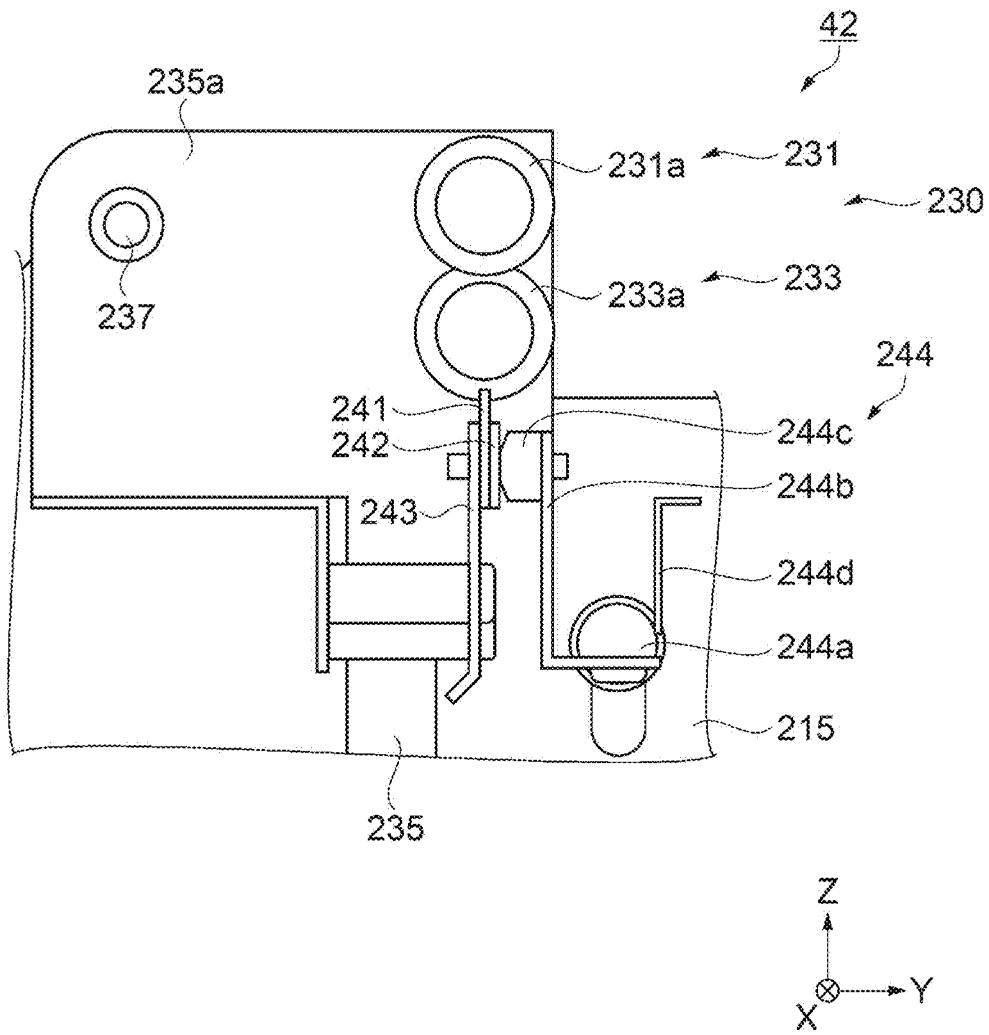

With reference to FIG. 7, a configuration of the fourth processing unit 244 included in the cleaning unit 42 will be described. Note that, the cleaning unit 41 and the cleaning unit 42 are different from each other in terms of arrangement, but are the same in terms of basic configuration. Therefore, the cleaning unit 42 will be described as a representative example, and description of the fourth processing unit 144 and the like of the cleaning unit 41 will be omitted.

As illustrated in FIG. 7, the fourth processing unit 244 of the cleaning unit 42 includes a shaft portion 244*a*, an arm portion 244*b*, a striking portion 244*c*, and a spring portion 244*d*. Although not illustrated, the fourth processing unit 244 also includes a wind-up portion and a lever portion. The wind-up portion is one of the plurality of gears of the gear group 210 described above. Here, FIG. 7 illustrates a state in which a striking operation, which will be described later, of the fourth processing unit 244 is not performed.

The shaft portion 244*a* extends along the X-axis and is rotatably supported by the frame unit 215 about a rotation shaft along the X-axis. The arm portion 244*b* and the spring portion 244*d* are fixed to the shaft portion 244*a*.

The arm portion 244*b* faces the fixing member 243 in the direction along the Y-axis. The striking portion 244*c* is arranged at an upper end portion of the arm portion 244*b*.

The blade unit 241 is fixed to an upper end portion of the fixing member 243 so as to protrude upward. An impact receiving portion 242 is mounted in the +Y direction of the blade unit 241. In other words, the blade unit 241 is held between the fixing member 243 and the impact receiving portion 242. The impact receiving portion 242 is fixed to the fixing member 243 at a position where the impact receiving portion 242 is brought into contact with the striking portion 244*c*.

The striking portion 244*c* is arranged at the upper end portion of the arm portion 244*b* so as to face the −Y direction while being in contact with the impact receiving portion 242. As the striking operation of the fourth processing unit 244, the striking portion 244*c* is once separated from the impact receiving portion 242 at the initial stage of the striking operation by the fourth processing unit 244, and then comes into contact with the impact receiving portion 242 while striking the same.

Accordingly, the impact of striking of the striking portion 244*c* is propagated to the blade unit 241 via the impact receiving portion 242. The impact has an effect of knocking off paper pieces and the like adhering to the blade unit 241 from the blade unit 241.

Since the impact is indirectly applied to the blade unit 241 by the impact receiving portion 242, breakage or the like is less likely to occur in the blade unit 241. In addition, the paper dust and the like adhering to the blade unit 241 are less likely to adhere to the striking portion 244*c*, and thus contamination to the striking portion 244*c* is suppressed.

The spring portion 244*d* is arranged so as to generate biasing force to the shaft portion 244*a* in the rotation direction with respect to the rotation shaft of the shaft portion 244*a*. Specifically, the spring portion 244*d* is, for example, a torsion coil spring, one end of which is fixed to the shaft portion 244*a* and the other end of which is fixed to the frame unit 215. Accordingly, in side view in the −X direction, the shaft portion 244*a* is biased counterclockwise, and the striking portion 244*c* is pressed against the impact receiving portion 242.

With reference to FIG. 8 to FIG. 12, a configuration and an action of the gear group 210 and the like of the cleaning unit 42 will be described. Here, the configuration and action of the gear group 110 of the cleaning unit 41 are the same as the gear group 210. Therefore, description of the configuration and action of the gear group 110 and the like in the cleaning unit 41 will be omitted. Note that, in the description of FIG. 8 and FIG. 10 to FIG. 12, a state in side view in the −X direction will be described unless otherwise specified.

Figure 8:
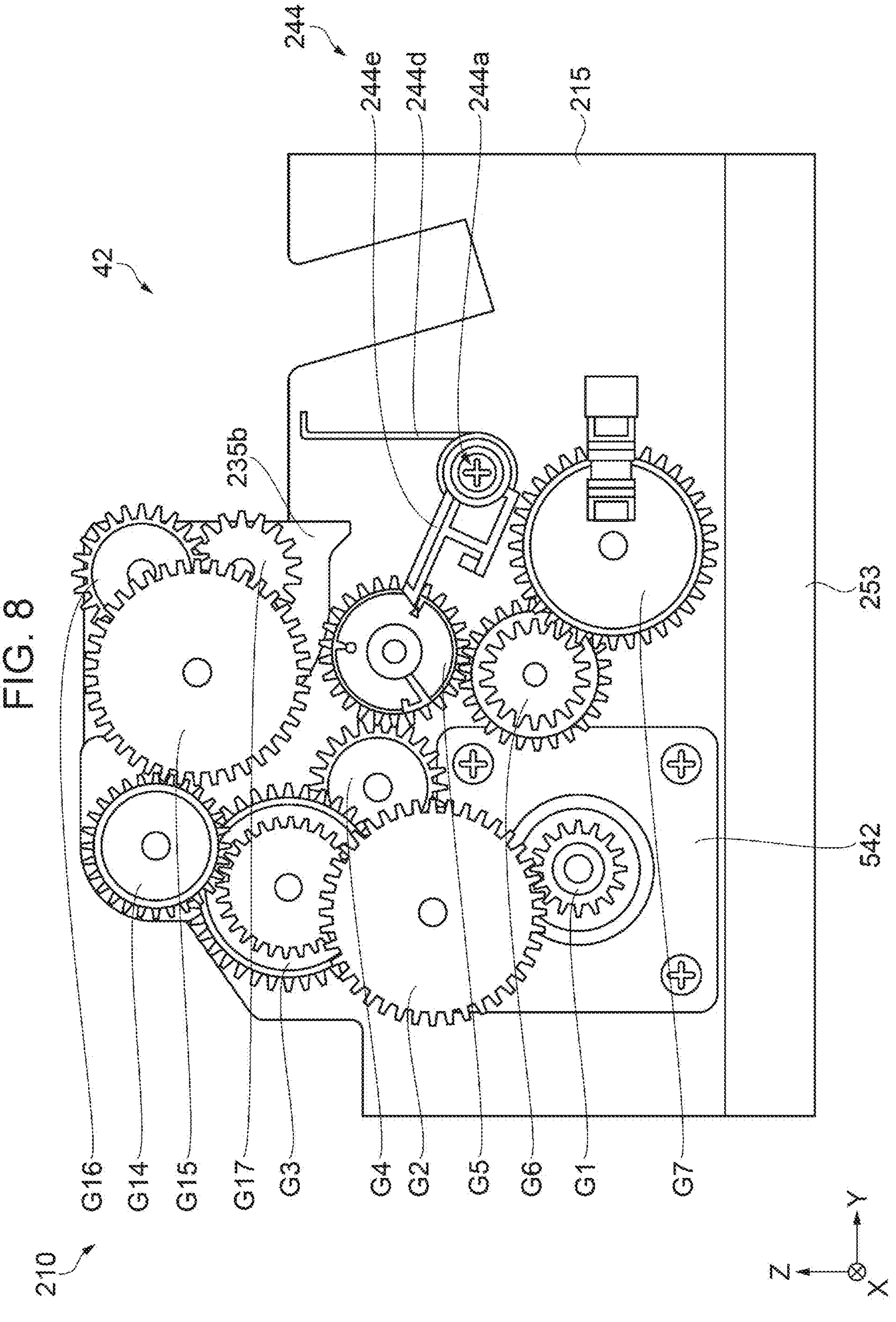
FIG. 8 is a side view illustrating a configuration of a gear group and the like of the second cleaning device.

As illustrated in FIG. 8, the gear group 210 includes, as a plurality of gears described above, gears G1, G2, G3, G4, G5, G6, and G7 and gears G14, G15, G16, and G17. The gear G1 to the gear G7, and the gear G14 to the gear G17 are each arranged in the above sequence in engagement with one another. The gear G1 is directly coupled to the output shaft of the driving unit 542. Each gear of the gear group 210 rotates about a rotation shaft along the X-axis.

The driving unit 542 rotates clockwise, which is the normal rotation, and counterclockwise, which is the reverse rotation, by control of the control unit 5. The rotational driving force of the driving unit 542 is transmitted from the gear G1 to the gear G2. The gear G2 includes a gear, not illustrated, which engages with the gear G1 in the +X direction of the gear which engages with the gear G3. Therefore, the rotational driving force is transmitted from the gear G2 to the gear G3, and further from the gear G3 to the gear G4, the gear G5, the gear G6, and the gear G7 sequentially. Further, the rotational driving force is also sequentially transmitted from the gear G3 to the gear G14, the gear G15, and the gears G16 and G17.

Although not illustrated in the drawings, an end portion of the first processing unit 231 in the −X direction is fixed to the gear G16, and an end portion of the third processing unit 233 in the −X direction is fixed to the gear G17.

The gear G3 is an example of a power switching unit and a power switching device of the present disclosure. The gear G3 is interposed between the driving unit 542 and the first processing unit 231. The gear G3 is also interposed between the driving unit 542 and the second processing unit 220 (not illustrated).

A lever portion 244*e* of the fourth processing unit 244 is arranged so as to correspond to the gear G5 which is the wind-up portion. The lever portion 244*e* is biased in a clockwise direction with the shaft portion 244*a* as the rotation shaft by being in contact with and riding on a convex portion, which will be described later, of the gear G5.

Figure 9:
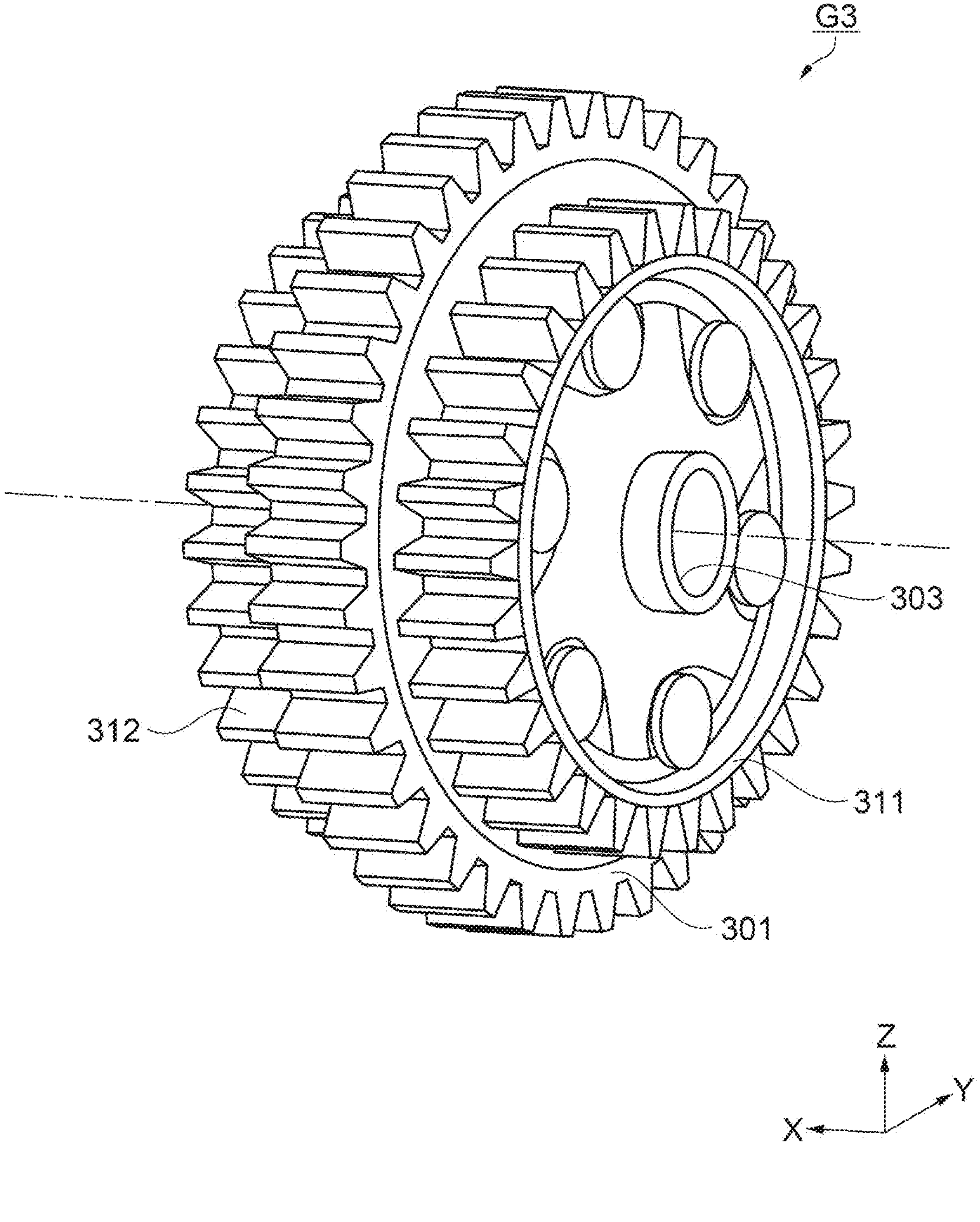
FIG. 9 is a perspective view illustrating a configuration of a power switching unit.

As illustrated in FIG. 9, the gear G3 includes an input gear 301, a first gear 311, a second gear 312, and an input shaft 303. The input gear 301, the first gear 311, and the second gear 312 rotate about the input shaft 303 as a rotation shaft. The rotation shaft is along the X-axis. The input gear 301, the first gear 311, and the second gear 312 are arranged in the order of the first gear 311, the input gear 301, and the second gear 312 toward the +X direction.

The reference circle diameter of the input gear 301 is larger than the reference circle diameters of the first gear 311 and the second gear 312. Note that, the reference circle diameter of the first gear 311 may be equal to or different from the reference circle diameter of the second gear 312. The reference circle diameter of the input gear 301 is larger than the reference circle diameters of the first gear 311 and the second gear 312.

The input gear 301 can receive from the driving unit 542 the driving force in the first rotation direction and the driving force in the second rotation direction via the above-described gears G1 and G2. In side view in the −X direction, the first rotation direction is the clockwise direction, and the second rotation direction is the counterclockwise direction.

The input shaft 303 is directly coupled to the input gear 301. Therefore, when the input gear 301 is driven by the driving unit 542 to rotate in the first rotation direction and the second rotation direction, the input shaft 303 rotates in the first rotation direction and the second rotation direction in conjunction with the input gear 301.

The first gear 311 and the second gear 312 include a one-way clutch. Therefore, the first gear 311 and the second gear 312 are selectively driven or stopped in accordance with the rotation direction of the input shaft 303.

Specifically, the one-way clutch of the first gear 311 rotates the first gear 311 in the first rotation direction, driven only by the rotation of the input shaft 303 in the first rotation direction. The one-way clutch of the second gear 312 rotates the second gear 312 in the second rotation direction, driven only by the rotation of the input shaft 303 in the second rotation direction. Thus, the driving force of the driving unit 542 is selectively distributed by the gears G3 in accordance with the rotation direction of the driving unit 542.

For the one-way clutches of the first gear 311 and the second gear 312, for example, a known technique such as a cam type, a sprag type, or the like can be adopted. In the present embodiment, a planetary gear system is used as the one-way clutch.

Figure 10:
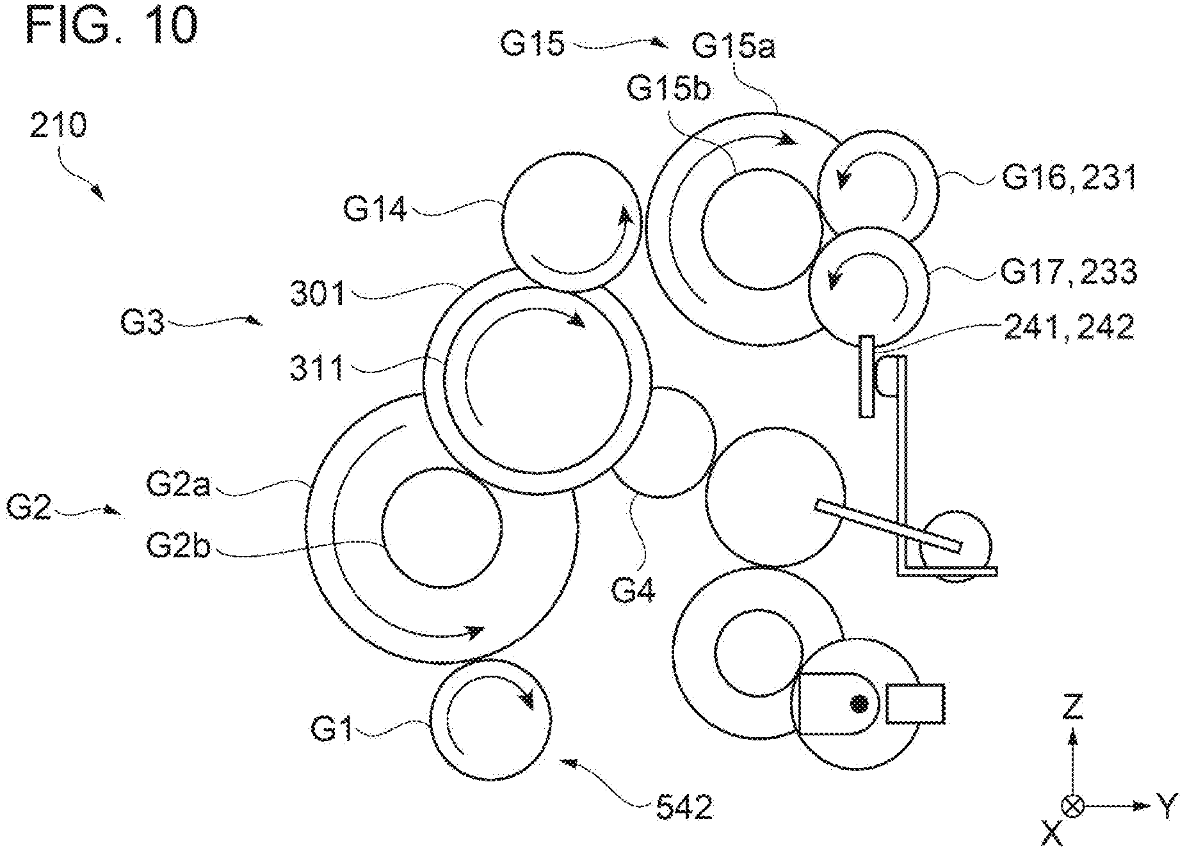

As illustrated in FIG. 10, when the driving unit 542 rotates in the normal direction, the gear G1 also rotates clockwise. The driving force of the rotation of the gear G1 rotates the gear G2 counterclockwise via the gear G2*a*. Note that, in FIG. 10 and FIG. 11, for convenience of description, the arrangement of each of the gears of the gear group 210 in the direction along the X-axis is different from the actual arrangement.

The driving force of the rotation of the gear G2 is transmitted from a gear G2*b* to the input gear 301 of the gear G3, and rotates the input gear 301 clockwise, which is the first rotation direction. As a result, the input shaft 303 (not illustrated) also rotates in the first rotation direction. The driving force of the rotation of the input shaft 303 in the first rotation direction rotates only the first gear 311 in the first rotation direction.

Thus, the one-way clutch of the first gear 311 transmits only the driving force of the rotation in the first rotation direction from the input shaft 303 to the first processing unit 231 and the third processing unit 233. Since the input shaft 303 rotates in the first rotation direction, the second gear 312 (not illustrated) is in a free state and is not driven.

The gear G14 is arranged corresponding to the first gear 311. The driving force of the rotation of the first gear 311 is transmitted to the gear G14 to rotate the gear G14 counterclockwise. The driving force of the rotation of the gear G14 is transmitted to a gear G15*a* of the gear G15 to rotate the gear G15 clockwise. The driving force of the rotation of the gear G15 is transmitted from a gear G15*b* to the gear G16 and the gear G17.

As described above, the driving force in the first rotation direction from the driving unit 542 that is received by the input shaft 303 is output from the input shaft 303 to the first processing unit 231 and the third processing unit 233 via the first gear 311. As a result, the first processing unit 231 and the third processing unit 233 each rotate counterclockwise.

Figure 11:
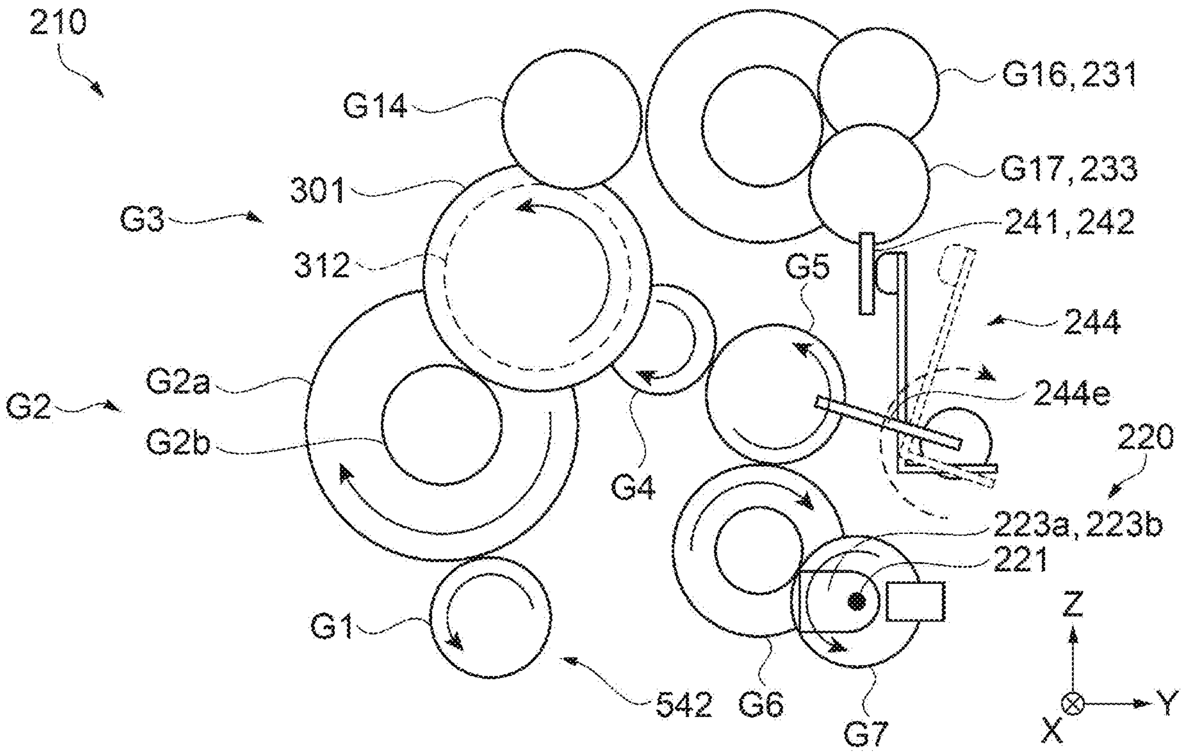

As illustrated in FIG. 11, when the driving unit 542 rotates in the reverse direction, the gear G1 also rotates counterclockwise. The driving force of the rotation of the gear G1 rotates the gear G2 clockwise via the gear G2*a*.

The driving force of the rotation of the gear G2 is transmitted from the gear G2*b* to the input gear 301 of the gear G3 to rotate the input gear 301 counterclockwise, which is the second rotation direction. As a result, the input shaft 303 (not illustrated) also rotates in the second rotation direction. The driving force of the rotation of the input shaft 303 in the second rotation direction rotates only the second gear 312.

Thus, the one-way clutch of the second gear 312 transmits only the driving force of the rotation in the second rotation direction from the input shaft 303 to the second processing unit 220 and the fourth processing unit 244. Since the input shaft 303 rotates in the second rotation direction, the first gear 311 (not illustrated) is in a free state and is not driven.

The gear G4 is arranged corresponding to the second gear 312. The driving force of the rotation of the second gear 312 is transmitted to the gear G4 to rotate the gear G4 clockwise. The driving force of the rotation of the gear G4 is transmitted to the gear G5 to rotate the gear G5 counterclockwise. The driving force of the rotation of the gear G5 operates the fourth processing unit 244 via the lever portion 244*e*. The striking operation by the operation of the fourth processing unit 244 will be described later.

The driving force of the rotation of the gear G5 is transmitted to the gear G6 to rotate the gear G6 clockwise. The driving force of the rotation of the gear G6 is transmitted to the gear G7 to rotate the gear G7 counterclockwise.

As described above, the driving force of the rotation in the second rotation direction from the driving unit 542 that is received by the input shaft 303 is output from the input shaft 303 to the second processing unit 220 and the fourth processing unit 244 via the second gear 312. The driving force of the rotation transmitted to the gear G7 rotates the shaft unit 221 and the cam members 223*a* and 223*b* of the second processing unit 220 counterclockwise. The operation of the second processing unit 220 will be described later.

Figure 12:
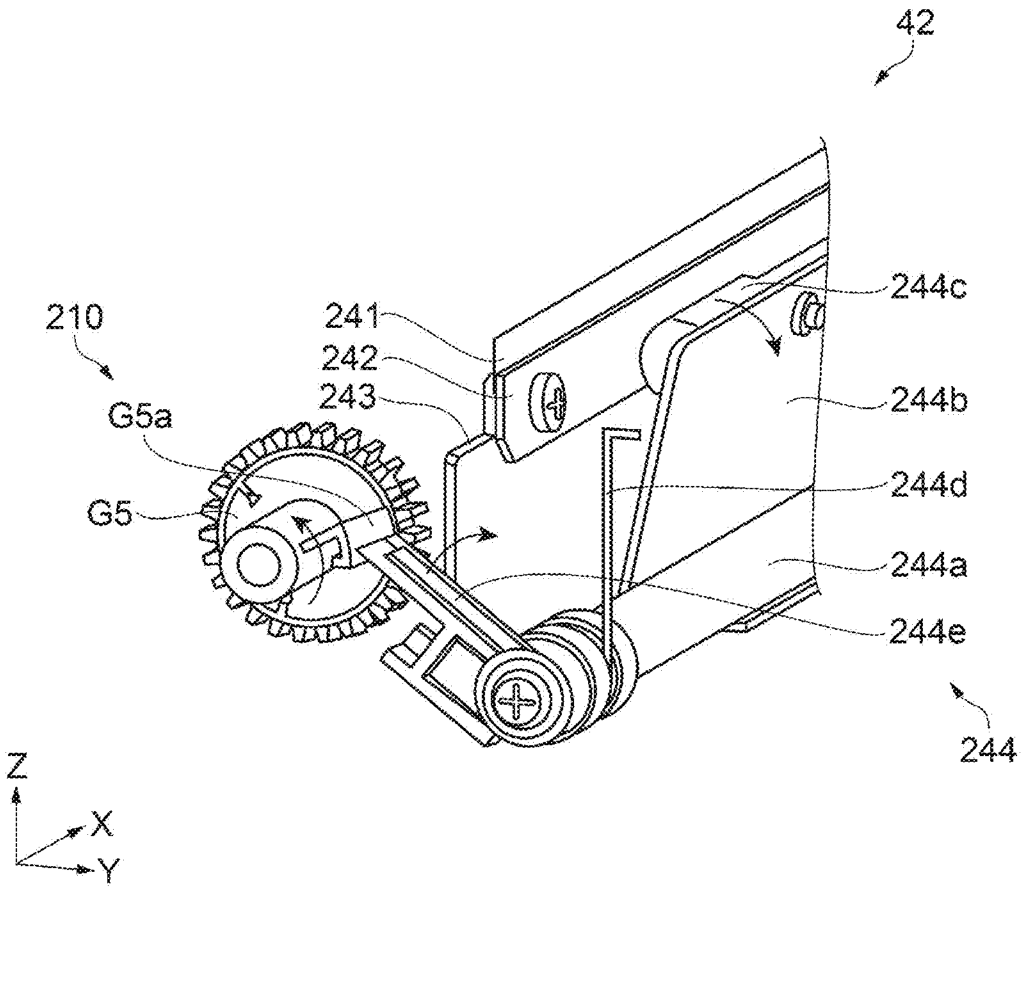
FIG. 12 is a perspective view illustrating the operating principle of a striking operation in the second cleaning device.

As illustrated in FIG. 12, the gear G5 has a convex portion G5*a*. The convex portion G5*a* is arranged in the −X direction of the gear G5. In side view in the −X direction, the convex portion G5*a* has a shape protruding from a rotation shaft of the gear G5 in a moving radius direction of the gear G5.

In plan view from above, the convex portion G5*a* is located at a position where the convex portion G5*a* intersects with and being in contact with a tip end of the lever portion 244*e* when the gear G5 rotates. When the gear G5 rotates counterclockwise, the tip end of the lever portion 244*e* rides on the convex portion G5*a*. As a result, the lever portion 244*e* is biased clockwise, and rotational force in the clockwise direction acts on the shaft portion 244*a*. That is, the gear G5 applies compression force to the spring portion 244*d* via the lever portion 244*e*.

The biasing force in the counterclockwise direction by the spring portion 244*d* acts on the shaft portion 244*a*, but the above compression force exceeds the biasing force. Therefore, the shaft portion 244*a* and the arm portion 244*b* rotate clockwise, and the striking portion 244*c* is separated from the impact receiving portion 242.

Although not illustrated in the drawings, when the gear G5 further rotates in the counterclockwise direction, the convex portion G5*a* and the tip end of the lever portion 244*e* are separated. As a result, the rotational force acted on the lever portion 244*e* and the shaft portion 244*a* by the convex portion G5*a* is eliminated. Then, at the moment when the convex portion G5*a* and the lever portion 244*e* are separated, the shaft portion 244*a* quickly rotates counterclockwise by repulsive force of the spring portion 244*d* against the compression force. Thus, the striking portion 244*c* strikes the impact receiving portion 242 to apply an impact to the blade unit 241. The principle of the striking operation by the fourth processing unit 244 has been described above.

A cleaning function of the cleaning unit 42 will be described with reference to FIG. 13 to FIG. 18. The cleaning unit 41 and the cleaning unit 42 are different in arrangement but have the same cleaning function. Therefore, the cleaning unit 42 will be described as a representative example, and the description of the cleaning function of the cleaning unit 41 will be omitted. Note that, in the description of FIG. 13 to FIG. 18, a state in side view in the −X direction is described unless otherwise specified.

Figure 13:
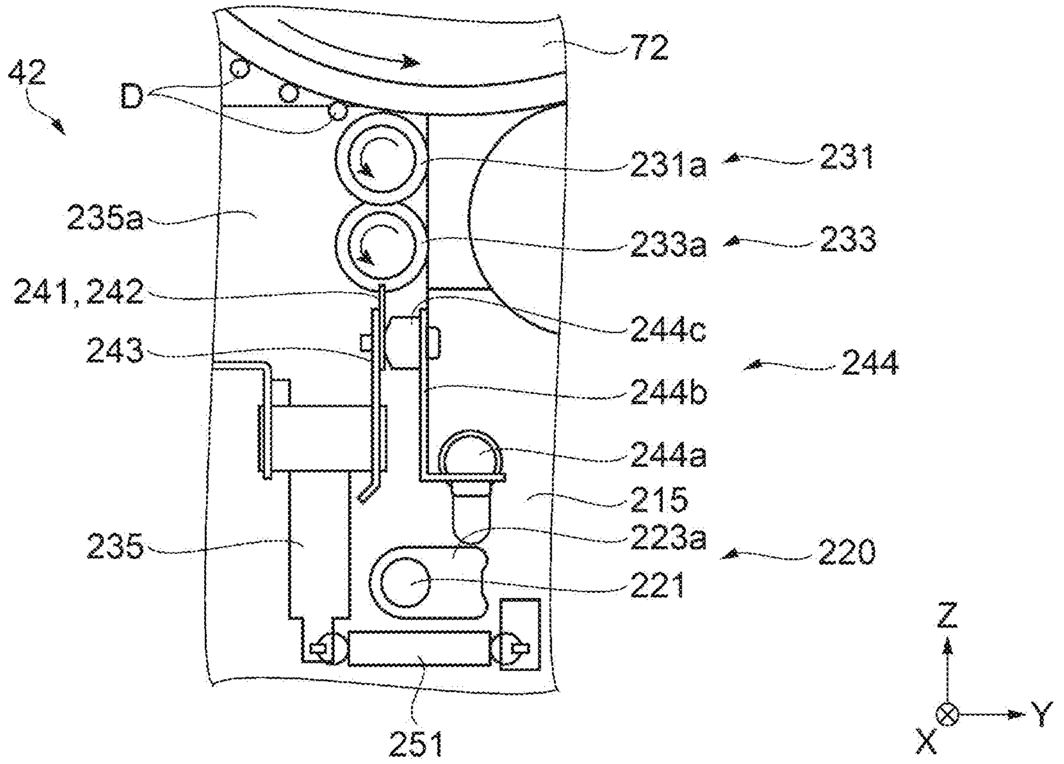
FIG. 13 is a schematic side view illustrating a cleaning function by the cleaning unit of the second cleaning device.

As illustrated in FIG. 13, paper dust D from the web W described above may adhere to the side surface of the processing roller 72 due to the operation of the sheet manufacturing apparatus 1.

The cleaning layer 231*a* of the first processing unit 231 is in contact with the side surface of the processing roller 72. When the first processing unit 231 is in contact with the processing roller 72, the processing roller 72, the first processing unit 231, and the third processing unit 233 rotate counterclockwise. At this time, the cleaning layer 231*a* of the first processing unit 231 is pressed against the side surface of the processing roller 72 by biasing of the spring member 251.

Figure 14:
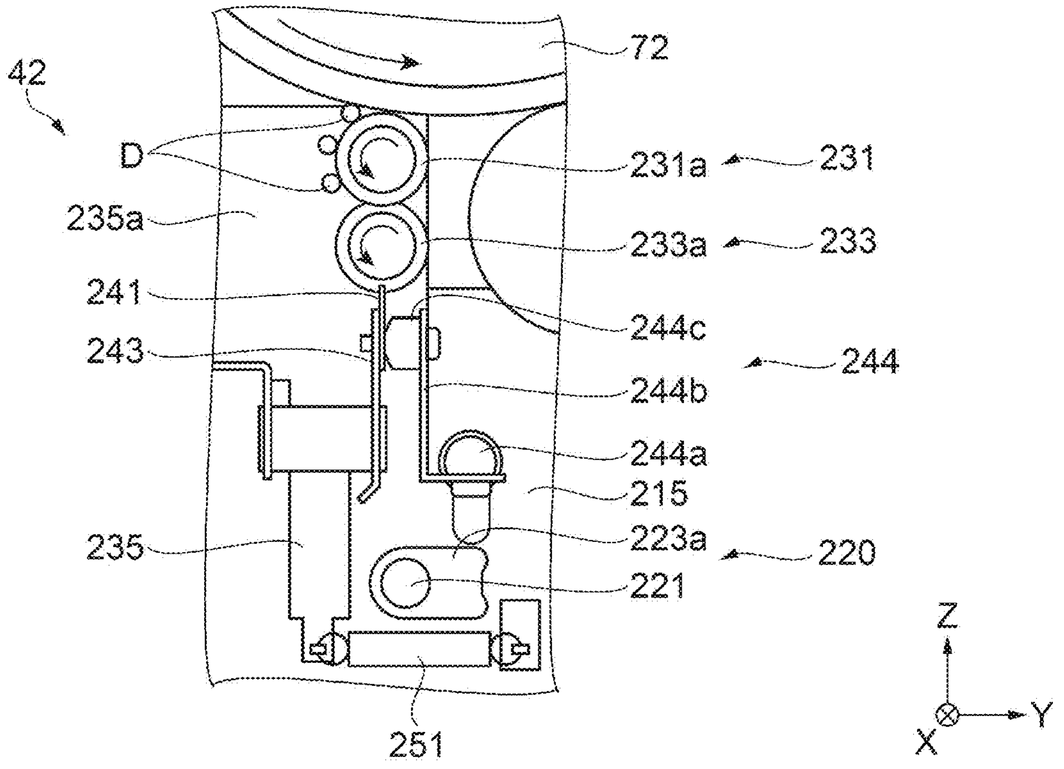
FIG. 14 is a schematic side view illustrating the cleaning function by the cleaning unit of the second cleaning device.

Next, as illustrated in FIG. 14, the paper dust D adhering to the side surface of the processing roller 72 reaches a region where the processing roller 72 and the cleaning layer 231*a* are in contact with each other by the rotation of the processing roller 72. Then, the first processing unit 231 comes into contact with the processing roller 72 while rotating, thereby cleaning the side surface of the processing roller 72. That is, the paper dust D adhering to the side surface of the processing roller 72 is entangled by the cleaning layer 231*a* and is transferred to the first processing unit 231.

Figure 15:
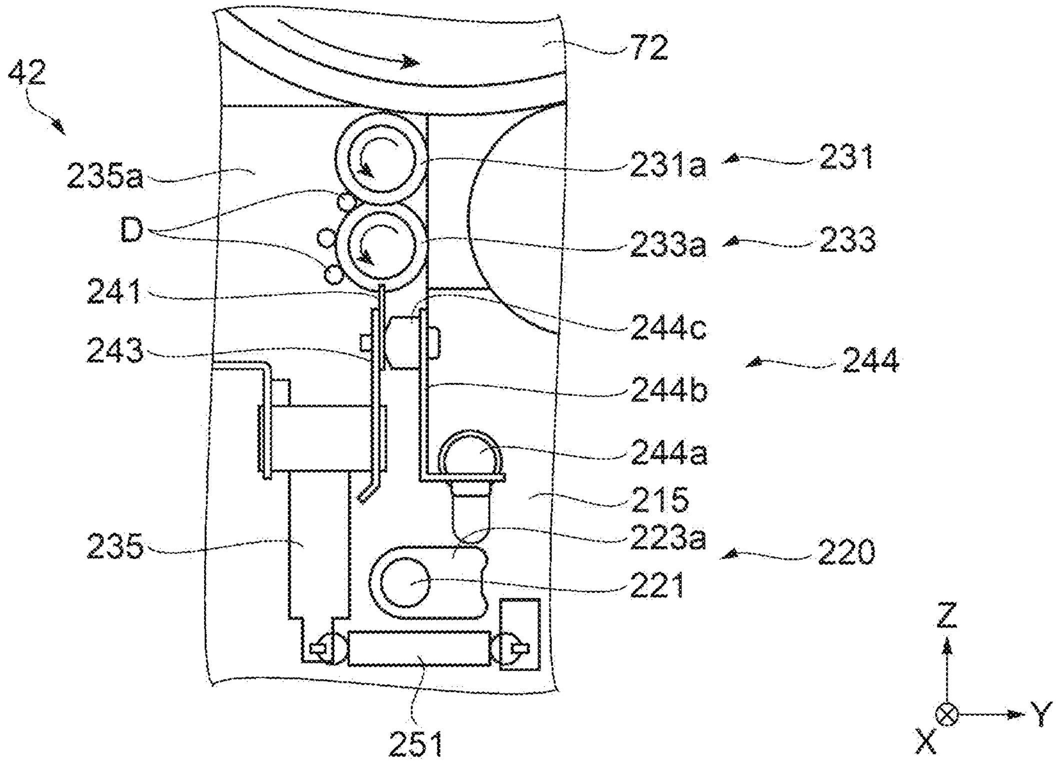
FIG. 15 is a schematic side view illustrating the cleaning function by the cleaning unit of the second cleaning device.

Next, as illustrated in FIG. 15, the paper dust D transferred to the cleaning layer 231*a* is entangled with the bristle materials of the surface layer 233*a* of the third processing unit 233 and transferred to the third processing unit 233. Thus, the cleaning layer 231*a* of the first processing unit 231 is cleaned, and the cleaning ability of the first processing unit 231 is maintained.

Figure 16:
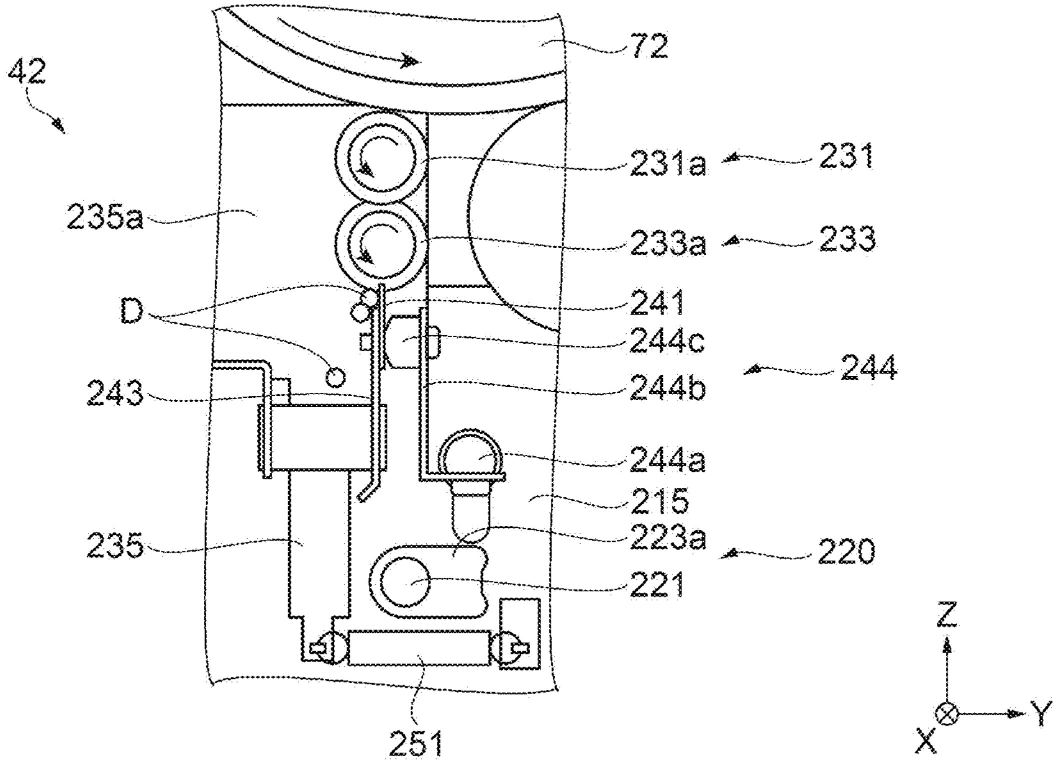
FIG. 16 is a schematic side view illustrating the cleaning function by the cleaning unit of the second cleaning device.

Next, as illustrated in FIG. 16, the paper dust D transferred to the surface layer 233*a* of the third processing unit 233 is scraped off by the blade unit 241 by the rotation of the third processing unit 233. As a result, the surface layer 233*a* of the third processing unit 233 is cleaned, and the cleaning ability of the third processing unit 233 with respect to the first processing unit 231 is maintained.

Here, when the amount of the paper dust D adhering to the blade unit 241 increases, the cleaning ability of the blade unit 241 to clean the third processing unit 233 decreases, and thus the cleaning ability of the third processing unit 233 to clean the first processing unit 231 also decreases, and there is a concern that the cleanliness of the processing roller 72 decreases. On the other hand, the paper dust D adhering to the blade unit 241 is removed by the impact of the striking operation described above, the cleaning ability of the blade unit 241 is recovered, and the cleaning ability of the third processing unit 233 is also recovered.

Figure 17:
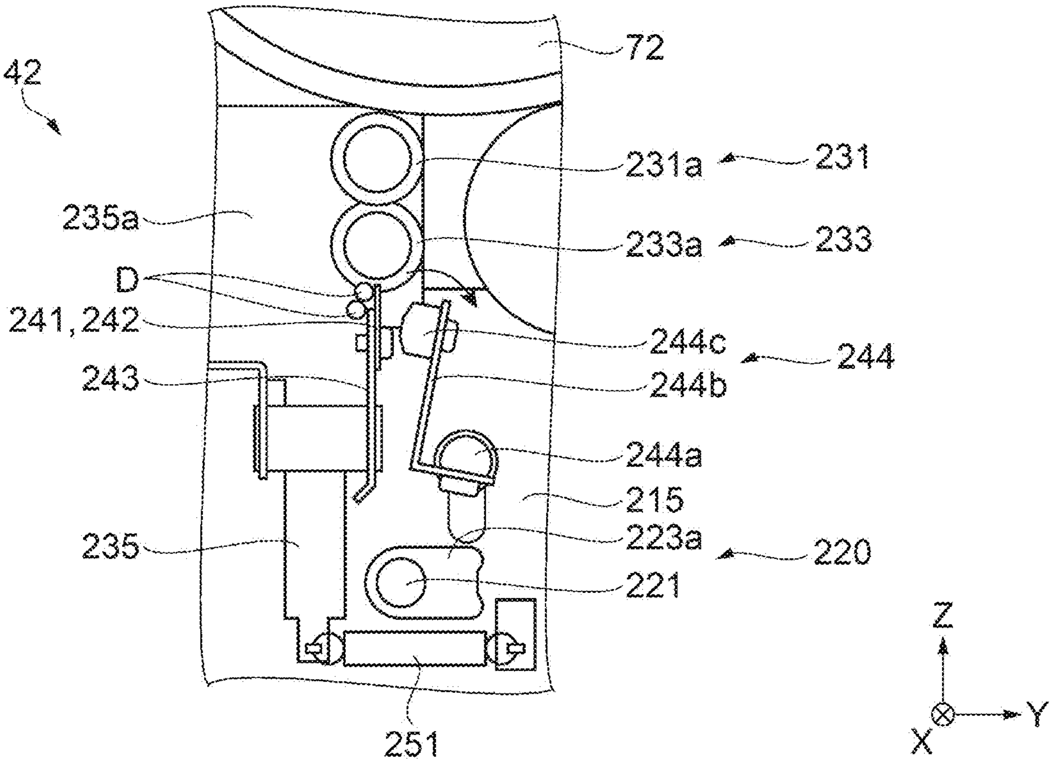
FIG. 17 is a schematic side view illustrating the cleaning function by the cleaning unit of the second cleaning device.
Figure 18:
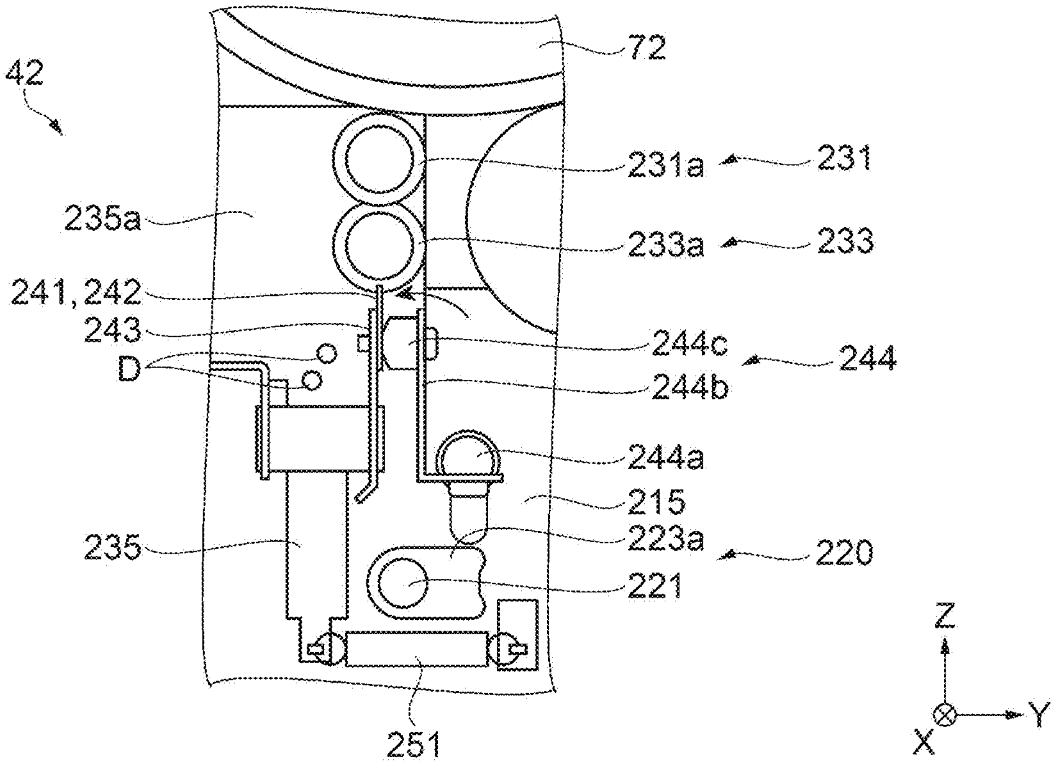
FIG. 18 is a schematic side view illustrating the cleaning function by the cleaning unit of the second cleaning device.

That is, as illustrated in FIG. 17, the gear G5 is rotated to rotate the shaft portion 244*a* and the arm portion 244*b* clockwise by a certain distance. Thus, the striking portion 244*c* is separated from the impact receiving portion 242. Then, the gear G5 is further rotated, and as illustrated in FIG. 18, the shaft portion 244*a* and the arm portion 244*b* are instantaneously rotated counterclockwise by the repulsive force of the spring portion 244*d*. Therefore, the striking portion 244*c* strikes the impact receiving portion 242, and the impact is applied to the blade unit 241. As a result, the paper dust D adhering to the blade unit 241 falls and is collected in the paper dust collecting unit 253 (not illustrated).

As a result, the cleaning ability of the cleaning unit 42 with respect to the processing roller 72 is maintained. As described above, the function of the cleaning unit 41 is the same as that of the cleaning unit 42. Therefore, same as the cleaning unit 42, the cleaning ability of the cleaning unit 41 corresponding to the processing roller 71 is also maintained.

In FIG. 17 and FIG. 18, the striking operation of the fourth processing unit 244 is performed in a state where the processing roller 72 and the first processing unit 231 are in contact with each other, but the present disclosure is not limited thereto. The above-described control unit 5 may cause the fourth processing unit 244 to apply the impact to the blade unit 241 when the first processing unit 231 is separated from the processing roller 72.

Figure 19:
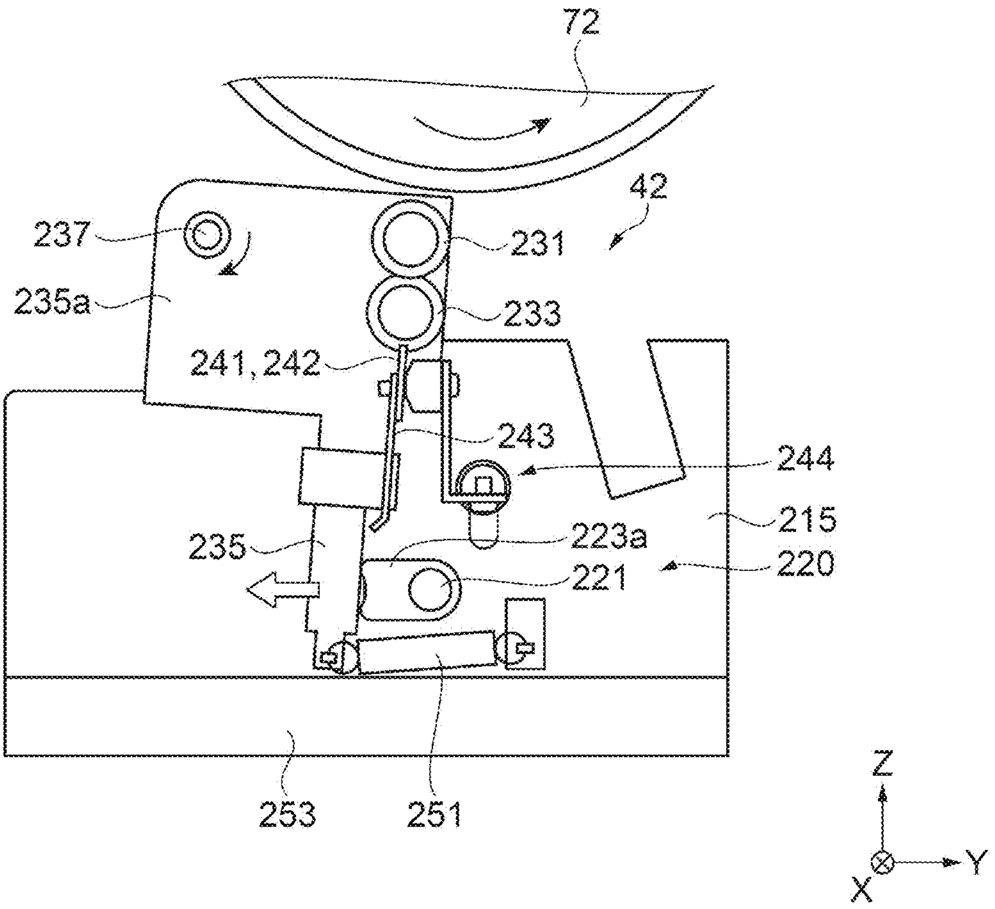
FIG. 19 is a side view illustrating a posture of the cleaning unit in the second cleaning device at the time of separation.
Figure 20:
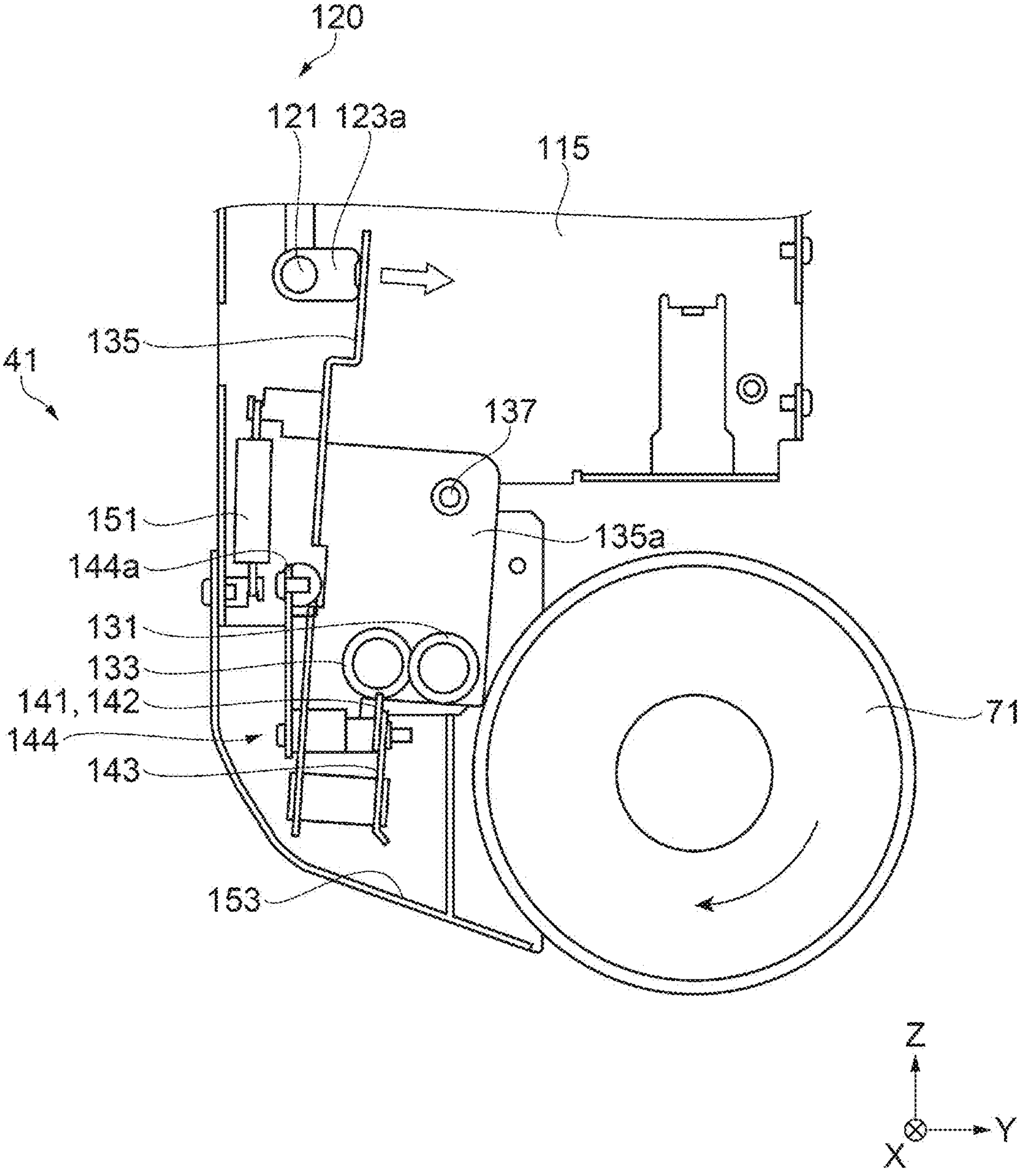
FIG. 20 is a side view illustrating a posture of the cleaning unit in the first cleaning device at the time of separation.

The function of the second processing units 120 and 220 will be described with reference to FIG. 19 and FIG. 20. In the description of FIG. 19 and FIG. 20, unless otherwise specified, a state in side view in the −X direction will be described.

The second processing unit 220 is caused to separate the first processing unit 231 from the processing roller 72. Specifically, from the state of FIG. 6 described above, as illustrated in FIG. 19, the posture of the support member 235 is changed by the second processing unit 220. Specifically, the shaft unit 221 is rotated to bring the protruding portion of the cam member 223*a* into contact with the lower end portion of the support member 235 from the +Y direction. Although not illustrated, the cam member 223*b* moves in conjunction with the cam member 223*a*, and comes into contact with the lower end portion of the support member 235 corresponding to the cam member 223*b* from the +Y direction.

At this time, each lower end portion of the support member 235 is biased substantially in the −Y direction by being in contact with the cam members 223*a* and 223*b*. This biasing force is larger than that of the spring member 251. Therefore, the support member 235 rotates clockwise about the rotation shaft 237 as the rotation center by a certain distance. Then, the first processing unit 231 is separated from the processing roller 72.

With this, when the processing of the web W is in progress, no impact is applied from the fourth processing unit 244 to the blade unit 241. Therefore, vibrations caused by the impact applied to the fourth processing unit 244, reaction force of the impact, and the like are not propagated to the processing roller 72 and the like. Therefore, in the belt-shaped sheet P1 formed from the web W, deterioration in quality, such as thickness and the like can be prevented.

For the same reason, in the cleaning unit 41, the impact may be applied from the fourth processing unit 144 to the blade unit 141 when the first processing unit 131 is separated from the processing roller 71.

The second processing unit 120 is caused to separate the first processing unit 131 from the processing roller 71. Specifically, from the state of FIG. 4 described above, as illustrated in FIG. 20, the posture of the support member 135 is changed by the second processing unit 120. Specifically, the shaft unit 121 is rotated to bring the protruding portion of the cam member 123*a* into contact with the upper end portion of the support member 135 from the +Y direction. Note that, although not illustrated, the cam member 123*b* moves in conjunction with the cam member 123*a*, and comes into contact with the upper end portion of the support member 135 corresponding to the cam member 123*b* from the +Y direction.

At this time, each upper end portion of the support member 135 is biased substantially in the +Y direction by being in contact with the cam members 123*a* and 123*b*. This biasing force is larger than that of the spring member 151. Therefore, the support member 135 rotates clockwise about the rotation shaft 137 as the rotation center by a certain distance. Thus, the first processing unit 131 is separated from the processing roller 71.

According to the present embodiment, the following effects can be obtained.

While the second processing unit 220 that separates the first processing unit 231 from the processing roller 72 is provided, an increase in cost can be suppressed and a reduction in size can be facilitated. Specifically, by rotating the driving unit 542 in the normal direction and the reverse direction, the driving force of the driving unit 542 is distributed to the first processing unit 231 and the second processing unit 220 by the gear G3 serving as the power switching unit. Therefore, the cleaning of the processing roller 72 and the separating operation of the first processing unit 231 from the processing roller 72 can be driven by the single driving unit 542.

In addition, in the same manner as described above, while the second processing unit 120 that separates the first processing unit 131 from the processing roller 71 is provided, an increase in cost can be suppressed and a reduction in size can be facilitated. Specifically, by rotating the driving unit 541 in the normal direction and the reverse direction, the driving force of the driving unit 541 is distributed to the first processing unit 131 and the second processing unit 120 by the gear G3 serving as the power switching unit. Therefore, the cleaning of the processing roller 71 and the separating operation of the first processing unit 131 from the processing roller 71 can be driven by the single driving unit 541.

As described above, the sheet manufacturing apparatus 1 that includes the second processing units 120 and 220 and that suppresses an increase in cost and facilitates a reduction in size can be provided.

The driving force is selectively transmitted to the first gear 311 and the second gear 312 in accordance with the rotation direction of the driving force received by the input gear 301. That is, one of the first gear 311 and the second gear 312 can be driven by rotating the output shaft serving as the driving force source in the normal direction and in the reverse direction. Therefore, providing an additional driving force source is not necessary, and suppressing an increase in cost and reducing the size of an apparatus to which the power switching device is applied can be facilitated. Therefore, a power switching device that suppresses an increase in cost and contributes to a reduction in size can be provided.

What is claimed is:

1. A sheet manufacturing apparatus, comprising:

a processing roller configured to process a web containing fibers;

a first processing unit configured to come into contact with and clean the processing roller;

a second processing unit configured to separate the first processing unit from the processing roller;

a driving unit configured to drive the first processing unit and the second processing unit; and a power switching unit interposed between the driving unit and the first processing unit and the second processing unit, wherein the power switching unit includes an input gear configured to receive, from the driving unit, driving force in a first rotation direction and driving force in a second rotation direction, an input shaft configured to rotate in the first rotation direction and in the second rotation direction in conjunction with the input gear, and a first gear and a second gear whose rotation shaft is the input shaft, the driving force in the first rotation direction is output from the input shaft to the first processing unit via the first gear, and the driving force in the second rotation direction is output from the input shaft to the second processing unit via the second gear.

2. The sheet manufacturing apparatus according to claim 1, further comprising a control unit configured to control a rotation direction of the driving unit.

3. The sheet manufacturing apparatus according to claim 1, wherein the first gear and the second gear each include a one-way clutch, the one-way clutch of the first gear transmits only the driving force in the first rotation direction from the input shaft to the first processing unit, and the one-way clutch of the second gear transmits only the driving force in the second rotation direction from the input shaft to the second processing unit.

4. The sheet manufacturing apparatus according to claim 1, further comprising a third processing unit configured to clean the first processing unit, wherein the driving force in the first rotation direction is also output from the input shaft to the third processing unit via the first gear.

5. The sheet manufacturing apparatus according to claim 4, further comprising:

a blade unit configured to clean the third processing unit; and a fourth processing unit configured to clean the blade unit, wherein the driving force in the second rotation direction is also output from the input shaft to the fourth processing unit via the second gear.

6. The sheet manufacturing apparatus according to claim 1, wherein the first processing unit is configured to come into contact with the processing roller while rotating in a same direction as the processing roller and clean the processing roller.

* * * * *